US012762421B2

(12) United States Patent
Huang et al.

(10) Patent No.: US 12,762,421 B2
(45) Date of Patent: Oct. 13, 2026

(54) SYSTEM AND METHOD FOR MULTI-OBJECTIVE REINFORCEMENT LEARNING

(71) Applicant: ROYAL BANK OF CANADA, Toronto (CA)

(72) Inventors: Hongfeng Huang, Toronto (CA); Jacob Chmura, Toronto (CA); Zhuo Yu, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 706 days.

(21) Appl. No.: 18/130,776

(22) Filed: Apr. 4, 2023

(65) Prior Publication Data

US 2023/0316088 A1 Oct. 5, 2023

Related U.S. Application Data

(60) Provisional application No. 63/327,520, filed on Apr. 5, 2022.

(51) Int. Cl.
*G06N 3/092* (2023.01)
*G06N 3/044* (2023.01)

(52) U.S. Cl.
CPC ............ *G06N 3/092* (2023.01); *G06N 3/044* (2023.01)

(58) Field of Classification Search
CPC ........ G06N 3/092; G06N 3/044; G06N 3/006; G06N 3/0442
See application file for complete search history.

(56) References Cited

U.S. PATENT DOCUMENTS

2019/0354895 A1* 11/2019 Vasudevan ............. G06N 3/045
2019/0370649 A1* 12/2019 Burhani ................... G06N 3/08
2020/0020061 A1 1/2020 Sunder et al.

FOREIGN PATENT DOCUMENTS

| | | | |
|---|---|---|---|
| CA | 3177372 | A1 | 11/2021 |
| WO | 2021156516 | A1 | 8/2021 |
| WO | 2022218512 | A1 | 10/2022 |

OTHER PUBLICATIONS

Abels, Axel, et al. "Dynamic weights in multi-objective deep reinforcement learning." International conference on machine learning. PMLR, 2019. https://proceedings.mlr.press/v97/abels19a/abels19a.pdf (Year: 2019).*

(Continued)

*Primary Examiner* — Michael H Hoang
(74) *Attorney, Agent, or Firm* — Norton Rose Fulbright Canada LLP

(57) ABSTRACT

Systems are methods are provided for processing multiple input objectives by a reinforcement learning agent. The method may include: instantiating a reinforcement learning agent that maintains a reinforcement learning neural network and generates, according to outputs of the reinforcement learning neural network, signals for communicating task requests; receiving a plurality of input data representing a plurality of user objectives associated with a task request; generating, based on the reinforcement learning neural network and the plurality of input data, an action output for generating a signal for communicating the task request; computing a reward based on the action output and the plurality of input data; and updating the reinforcement learning neural network based on the reward.

21 Claims, 14 Drawing Sheets

(56) References Cited

OTHER PUBLICATIONS

Hindsight Experience Replay (HER): https://arxiv.org/abs/1707.01495, Paper Summary Notes dated Jan. 8, 2021.
Paper: Hindsight Experience Replay, arXiv:1707.01495v3 [cs.LG] dated Feb. 23, 2018.
Extended European Search Report dated Sep. 19, 2023 issued in 23166725.4.
International Search Report and the Written Opinion dated Jul. 10, 2023 issued in PCT/CA2023/050457.
Song, H.F. et al. "Reward-based training of recurrent neural networks for cognitive and value-based tasks" Neuroscience, Research Article, New York University, United States; NYU Shanghai, China, pp. 1-24, Jan. 13, 2017 (Jan. 13, 2017), retrieved from https://elifesciences.org/articles/21492 on Jul. 9, 2023 (Sep. 7, 2023).
Zhu, Z. et al. "Transfer Learning in Deep Reinforcement Learning: A Survey" arXiv.org, v4, pp. 1-23, Mar. 4, 2021 (Apr. 3, 2021), retrieved from https://arxiv.org/abs/2009.07888v4 on Jul. 9, 2023 (Sep. 7, 2023).
Leung, J. et al. "Goal Modelling for Deep Reinforcement Learning Agents" ECML PKDD 2021, pp. 1-16, Sep. 10, 2021 (Oct. 9, 2021), retrieved from https:/ /202 I.ecmlpkdd.org/wp-content/uploads/2021/07 /sub 1058.pdf on Jul. 9, 2023 (Sep. 7, 2023).
Barreto, A. et al. "Fast reinforcement learning with generalized policy updates", PNAS, vol. 117, No. 48, pp. 30079-30087, Dec. 1, 2020 (Jan. 12, 2020), retrieved from https://www.pnas.org/doi/10.1073/pnas.1907370117 on Jul. 9, 2023 (Sep. 7, 2023).
Fu, ZY. et al. "Automatic Successive Reinforcement Learning with Multiple Auxiliary Rewards" IJCAI-19, pp. 2336-2342, Aug. 10, 2019 (Oct. 8, 2019), retrieved from https://www.iicai.org/proceedings/2019/324 on Jul. 9, 2023 (Sep. 7, 2023).
Canese, L. et al. "Multi-Agent Reinforcement Learning: A Review of Challenges and Applications" Applied Sciences, vol. 11, Issue 11, pp. 1-25, May 27, 2021 (Oct. 5, 2021), retrieved from https://www.mdpi.com/2076-3417/I 1/11/4948 on Jul. 9, 2023 (Sep. 7, 2023).
Florensa, C. et al. "Automatic Goal Generation for Reinforcement Learning Agents" arXiv.org, v5, pp. 1-14, Jul. 23, 2018 (Jul. 23, 2018), retrieved from https://arxiv.org/abs/1705.06366 on Jul. 9, 2023 (Sep. 7, 2023).

* cited by examiner

SYSTEM AND METHOD FOR MULTI-OBJECTIVE REINFORCEMENT LEARNING

CROSS-REFERENCE TO RELATED APPLICATION

This application claims the benefit of and priority to U.S. provisional patent application No. 63/327,520 filed on Apr. 5, 2022, the entire content of which is herein incorporated by reference.

FIELD

The present disclosure generally relates to the field of computer processing and reinforcement learning.

BACKGROUND

Historically, different user objectives may be processed by developing a suite of rule-based algorithms that collectively span the set of behaviors that a client or user may demand. Reinforcement learning neural networks may be used to execute user tasks when a clear target or benchmark can be represented using the notion of reward. However, the standard Markov Decision Process (MDP) formulation taken in reinforcement learning, which optimizes for a scalar reward, is not sufficient to handle the large set of execution styles that sophisticated users may demand, and as such, these systems are typically limited to situations where there is a single, well-defined execution benchmark.

SUMMARY

In accordance with an aspect, there is provided a computer-implemented system for processing multiple input objectives by a reinforcement learning agent, the system may include: at least one processor; memory in communication with the at least one processor; software code stored in the memory, which when executed at the at least one processor causes the system to: instantiate a reinforcement learning agent that maintains a reinforcement learning neural network and generates, according to outputs of the reinforcement learning neural network, signals for communicating task requests; receive a plurality of input data representing a plurality of user objectives associated with a task request; generate, based on the reinforcement learning neural network and the plurality of input data, an action output for generating a signal for communicating the task request; compute a reward based on the action output and the plurality of input data; and update the reinforcement learning neural network based on the reward.

In some embodiments, based on the action output, the system may be configured to generate at least one command signal for operating a vehicle system of the vehicle.

In some embodiments, the plurality of input data comprises a weighted vector with weights defining a relative importance of each of the plurality of user objectives.

In some embodiments, the reward is weighted based on the weighted vector.

In some embodiments, the reward comprises a vector having a plurality of individual reward values, each of the plurality of individual reward values being a weighted value computed based on the relative importance of each respective objective from the plurality of user objectives.

In some embodiments, the plurality of user objectives comprises at least two of: an asset, an amount for execution, a priority for execution, or a time limit for execution.

In some embodiments, the reinforcement learning neural network comprises at least one of: a Feed Forward Neural Networks (FFNN), a multi-layer perceptron (MPL), a recurrent neural network (RNN), or an asynchronous actor critic (A3C) neural network.

In some embodiments, the software code, when executed at the at least one processor, further causes the system to: compute a loss based on the reward using a loss function; and update the reinforcement learning neural network based on the loss.

In some embodiments, the software code, when executed at the at least one processor, further causes the system to: receive a set of historical task data including one or more of: at least one historical state data for a historical task associated with the task request, a plurality of historical user objectives, and at least one historical action output for the at least one historical state data; generate an augmented data based on the set of historical task data and the plurality of user objectives associated with the task request; and compute an updated reward based on the augmented data.

In some embodiments, the software code, when executed at the at least one processor, further causes the system to: compute an updated loss based on the updated reward using a loss function; and update the reinforcement learning neural network based on the updated loss.

In some embodiments, the software code, when executed at the at least one processor, further causes the system to: generate a historical weighted vector based on the plurality of historical user objectives, the historical weighted vector with weights defining a relative importance of each of the plurality of historical user objectives.

In some embodiments, the updated reward is computed based on the historical weighted vector.

In accordance with another aspect, there is provided a computer-implemented method for processing multiple input objectives by a reinforcement learning agent, the method may include: instantiating a reinforcement learning agent that maintains a reinforcement learning neural network and generates, according to outputs of the reinforcement learning neural network, signals for communicating task requests; receiving a plurality of input data representing a plurality of user objectives associated with a task request; generating, based on the reinforcement learning neural network and the plurality of input data, an action output for generating a signal for communicating the task request; computing a reward based on the action output and the plurality of input data; computing a reward based on the action output and the plurality of input data; and updating the reinforcement learning neural network based on the reward.

In some embodiments, the plurality of input data comprises a weighted vector with weights defining a relative importance of each of the plurality of user objectives.

In some embodiments, the reward is weighted based on the weighted vector.

In some embodiments, the reward comprises a vector having a plurality of individual reward values, each of the plurality of individual reward values being a weighted value computed based on the relative importance of each respective objective from the plurality of user objectives.

In some embodiments, the plurality of user objectives comprises at least two of: an asset, an amount for execution, a priority for execution, or a time limit for execution.

In some embodiments, the reinforcement learning neural network comprises at least one one of: a Feed Forward Neural Networks (FFNN), a multi-layer perceptron (MPL), a recurrent neural network (RNN), or an asynchronous actor critic (A3C) neural network.

In some embodiments, the method may include: computing a loss based on the reward using a loss function; and updating the reinforcement learning neural network based on the loss.

In some embodiments, the method may include: receiving a set of historical task data including one or more of: at least one historical state data for a historical task associated with the task request, a plurality of historical user objectives, and at least one historical action output for the at least one historical state data; generating an augmented data based on the set of historical task data and the plurality of user objectives associated with the task request; and computing an updated reward based on the augmented data.

In some embodiments, the method may include: computing an updated loss based on the updated reward using a loss function; and updating the reinforcement learning neural network based on the updated loss.

In some embodiments, the method may include generating a historical weighted vector based on the plurality of historical user objectives, the historical weighted vector with weights defining a relative importance of each of the plurality of historical user objectives.

In some embodiments, the updated reward is computed based on the historical weighted vector.

In accordance with yet another aspect, there is provided a non-transitory computer-readable storage medium storing instructions which when executed cause at least one computing device to: instantiate a reinforcement learning agent that maintains a reinforcement learning neural network and generates, according to outputs of the reinforcement learning neural network, signals for communicating task requests; receive a plurality of input data representing a plurality of user objectives associated with a task request; generate, based on the reinforcement learning neural network and the plurality of input data, an action output for generating a signal for communicating the task request; compute a reward based on the action output and the plurality of input data; and update the reinforcement learning neural network based on the reward.

Many further features and combinations thereof concerning embodiments described herein will appear to those skilled in the art following a reading of the instant disclosure.

DESCRIPTION OF THE FIGURES

In the figures, which illustrate example embodiments.

DETAILED DESCRIPTION

Figure 1:
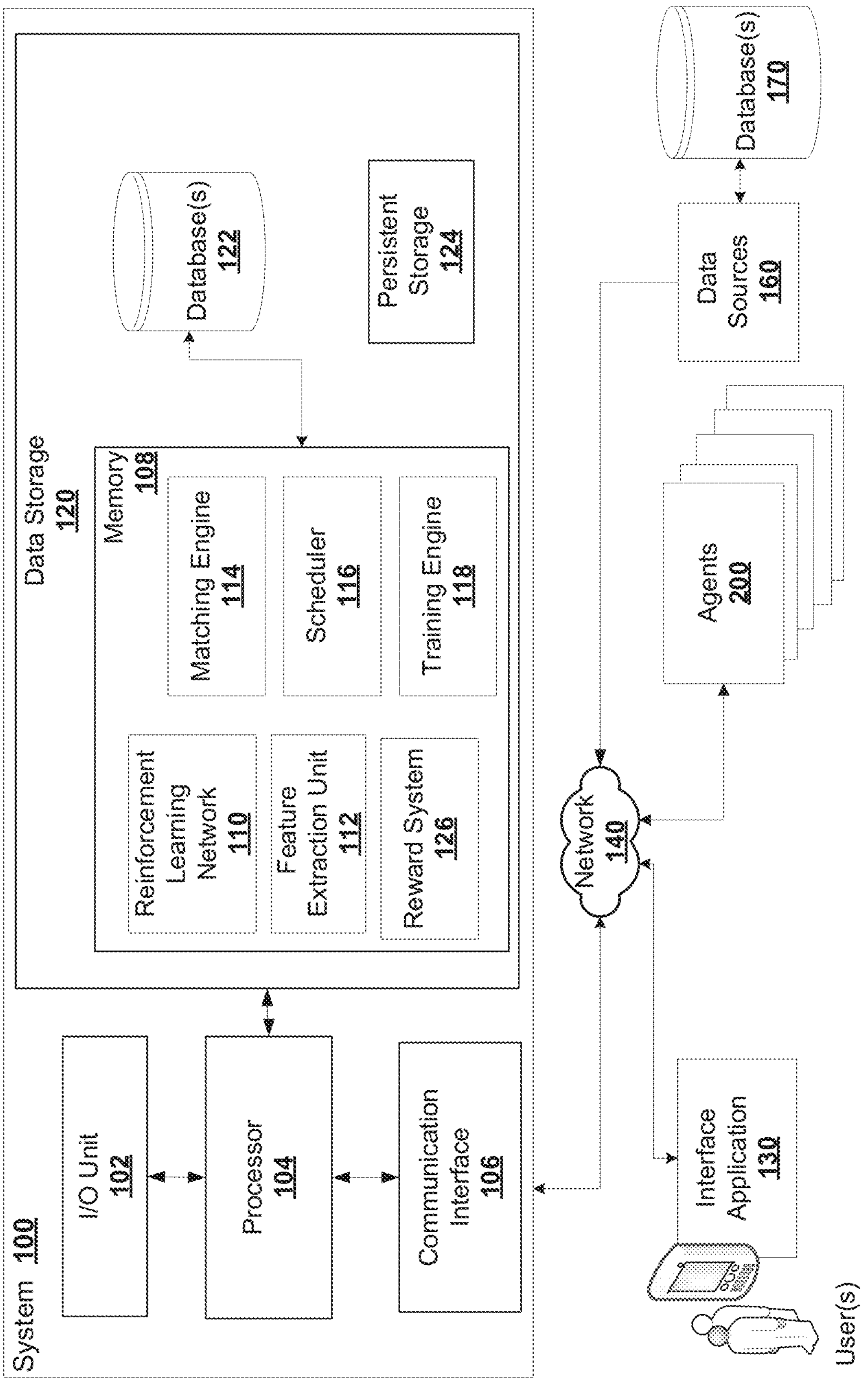
FIG. 1 is a schematic diagram of a computer-implemented system for training an automated agent, in accordance with an embodiment.

FIG. 1 is a high-level schematic diagram of a computer-implemented system 100 for instantiating and training automated agents 200 (also referred to as agent(s) 200) having a reinforcement learning neural network, in accordance with an embodiment.

In various embodiments, system 100 is adapted to perform certain specialized purposes. In some embodiments, system 100 is adapted to instantiate and train automated agents 200 for playing a video game. In some embodiments, system 100 is adapted to instantiate and train automated agents 200 for implementing a chatbot that can respond to simple inquiries based on multiple user objectives. In other embodiments, system 100 is adapted to instantiate and train automated agents 200 to generate requests to be performed in relation to securities (e.g., stocks, bonds, options or other negotiable financial instruments). For example, automated agent 200 may generate requests to trade (e.g., buy and/or sell) securities by way of a trading venue. In yet other embodiments, system 100 is adapted to instantiate and train automated agents 200 for performing image recognition tasks. As will be appreciated, system 100 is adaptable to instantiate and train automated agents 200 for a wide range of purposes and to complete a wide range of tasks.

Once an automated agent 200 has been trained, it generates output data reflective of its decisions to take particular actions in response to particular input data. Input data include, for example, values of a plurality of state variables relating to an environment being explored by an automated agent 200 or a task being performed by an automated agent 200. In some embodiments, input data may include multiple user objectives received from one or more interface applications from one or more user devices. The multiple user objectives may be pre-processed and converted to a preference-weighted vector w including a respective weighted representation of each of the multiple user objectives.

The mapping of input data to output data may be referred to as a policy 309, and governs decision-making of an automated agent 200. A policy 309 may, for example, include a probability distribution of particular actions given particular values of state variables at a given time step. A policy 309 may be a deterministic policy that maps each state s to action a.

System 100 includes an I/O unit 102, a processor 104, a communication interface 106, and a data storage 120.

I/O unit 102 enables system 100 to interconnect with one or more input devices, such as a keyboard, mouse, camera, touch screen and a microphone, and/or with one or more output devices such as a display screen and a speaker.

Processor 104 executes instructions stored in memory 108 to implement aspects of processes described herein. For example, processor 104 may execute instructions in memory 108 to configure a data collection unit, an interface unit to provide control commands to interface application 130, reinforcement learning network 110, feature extraction unit 112, matching engine 114, scheduler 116, training engine 118, reward system 126, and other functions described herein. Processor 104 can be, for example, various types of general-purpose microprocessor or microcontroller, a digital signal processing (DSP) processor, an integrated circuit, a field programmable gate array (FPGA), a reconfigurable processor, or any combination thereof.

Referring again the FIG. 1, aspects of system 100 are further described with an example embodiment in which system 100 is configured to function as an autonomous vehicle driving control unit, a HVAC control unit, or a resource exchange or trading platform. In such embodiments, automated agent 200 may receive task requests to be performed in relation to each type of operation, e.g., driving commands, HVAC control commands, requests to trade, buy or sell securities, respectively.

Feature extraction unit 112 is configured to process input data to compute a variety of features. The input data can represent user commands and user objectives, which may include a task request, such as to take control of a vehicle on a highway, to increase temperature to a specific value, or to execute a trade order.

When the system 100 is used to operate a vehicle based on multiple user objectives, example features include velocity of the vehicle, a traveling direction of the vehicle, a current location of the vehicle, surrounding objects as detected by one or more sensors of the vehicle, total number of drivers in seats, weight of each passenger, and so on. The vehicle feature data may be obtained from the vehicle's control unit, which receives real time or near real time data from sensors and other parts of the vehicle.

For another example, when the system 100 is used to operate a heating, ventilation, and air conditioning (HVAC) system of a building, example features include a plurality of environmental and operating data, such as a current temperature of each room and each floor, a maximum and minimum temperature setpoint for each room and each floor, outside air temperature and humidity level, a current power consumption, and so on. The environmental and operating data may be obtained from sensors and control units of the building in real time.

When the system 100 is used to execute one or more trade orders based on multiple user objectives, example features include pricing features, volume features, time features, Volume Weighted Average Price features, and market spread features.

Matching engine 114 is configured to implement a training exchange defined by liquidity, counter parties, market makers and exchange rules. The matching engine 114 can be a highly performant stock market simulation environment designed to provide rich datasets and ever changing experiences to reinforcement learning networks 110 (e.g. of agents 200) in order to accelerate and improve their learning. The processor 104 may be configured to provide a liquidity filter to process the received input data for provision to the machine engine 114, for example.

In some embodiments, the matching engine 114 may be implemented as a vehicle simulation engine or a building simulation engine, which may simulate vehicle driving conditions or a HVAC operating environment, respectively, configured to provide rich datasets and experiences to reinforcement learning networks 110 (e.g. of agents 200) in order to accelerate and improve their learning.

Scheduler 116 is configured to follow a historical Volume Weighted Average Price curve to control the reinforcement learning network 110 within schedule satisfaction bounds computed using order volume and order duration.

In some embodiments, system 100 may process task requests using the reinforcement learning network 110 in response to action output from an automated agent 200.

Some embodiments of system 100 can be configured to function as a trading platform. In such embodiments, an automated agent 200 may generate requests to be performed in relation to securities, e.g., requests to trade, buy and/or sell securities.

Example embodiments can provide users with visually rich, contextualized explanations of the behaviour of an automated agent 200, where such behaviour includes requests generated by automated agents 200, decision made by automated agent 200, recommendations made by automated agent 200, or other actions taken by automated agent 200. Insights may be generated upon processing data reflective of, for example, environmental or market conditions, changes in policy of an automated agent 200, data outputted by neural network 308 describing the relative importance of certain factors or certain state variables.

Communication interface 106 enables system 100 to communicate with other components, to exchange data with other components, to access and connect to network resources, to serve applications, and perform other computing applications by connecting to a network 140 (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi or WiMAX), SS7 signaling network, fixed line, local area network, wide area network, and others, including any combination of these.

Data storage 120 can include memory 108, databases 122, and persistent storage 124. Data storage 120 may be configured to store information associated with or created by the components in memory 108 and may also include machine executable instructions. Persistent storage 124 implements one or more of various types of storage technologies, such as solid state drives, hard disk drives, flash memory, and may be stored in various formats, such as relational databases, non-relational databases, flat files, spreadsheets, extended markup files, etc.

Data storage 120 stores a model for a reinforcement learning neural network. The model is used by system 100 to instantiate one or more automated agents 200 that each maintain a reinforcement learning neural network 110 (which may also be referred to as a reinforcement learning network 110 or a network 110 for convenience). Automated agents may be referred to herein as reinforcement learning agents, and each automated agent may be referred to herein as a reinforcement learning agent.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

System 100 may connect to an interface application 130 installed on a user device to receive input data. The interface application 130 interacts with the system 100 to exchange data (including control commands) and cause to generate visual elements for display at a user interface on the user device. The visual elements can represent reinforcement learning networks 110 and output generated by reinforcement learning networks 110.

For example, the interface application 130 may receive a plurality of user input from a user, the user input may include a plurality of user objectives for a specific task request. For instance, when the task request is to sell or buy a specific asset (e.g., stock), the plurality of user objectives can include a time limit, a priority, a minimum or maximum price, and/or an amount of the asset. In some embodiments, the user may rank these user objectives from most important to least important. In other embodiments, the user does not give an explicit ranking, and the weight assigned to each of the user objectives may be a default value or as determined by the system 100. In yet other embodiments, only some of the user objectives may be ranked by the user, with the rest determined by the system 100.

In some embodiments, the plurality of user objectives may include one or more of: time limit, maximum price, minimum price, and amount of asset, which can be examples of mandatory attributes on an order request has, these attributes may be requirements that a user (e.g., a broker or trader agent) has to comply in order to execute the specific order request. In addition, the plurality of user objectives may further include one or more of: an urgency of execution, how well the execution should track a specific trading rate, a specific execution benchmark, which are examples of attributes the user can specify at his or her discretion.

System 100 may be operable to register and authenticate users (using a login, unique identifier, and password for example) prior to providing access to applications, a local network, network resources, other networks and network security devices.

System 100 may connect to different data sources 160 and databases 170 to store and retrieve input data and output data.

Processor 104 is configured to execute machine executable instructions (which may be stored in memory 108) to instantiate an automated agent 200 that maintains a reinforcement learning neural network 110, and to train reinforcement learning network 110 of automated agent 200 using training unit 118. Training unit 118 may implement various reinforcement learning algorithms known to those of ordinary skill in the art.

Processor 104 is configured to execute machine-executable instructions (which may be stored in memory 108) to train a reinforcement learning network 110 using reward system 126. Reward system 126 generates positive signals and/or negative signals to train automated agents 200 to perform desired tasks more optimally, e.g., to minimize and maximize certain performance metrics. A trained reinforcement learning network 110 may be provisioned to one or more automated agents 200.

Figure 2A:
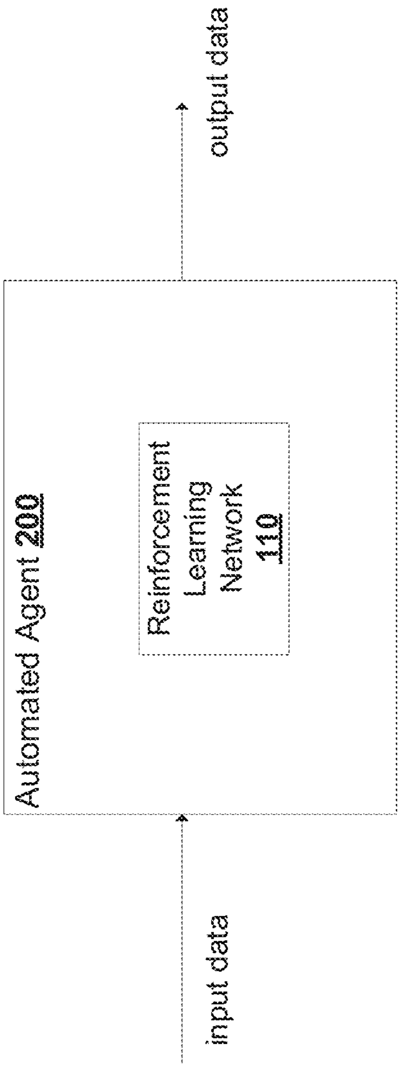
FIG. 2A is a schematic diagram of an automated agent of the system of FIG. 1, in accordance with an embodiment.

As depicted in FIG. 2A, automated agent 200 receives input data (via a data collection unit, not shown) and generates output data according to its reinforcement learning network 110. Automated agents 200 may interact with system 100 to receive input data and provide output data.

Figure 2B:
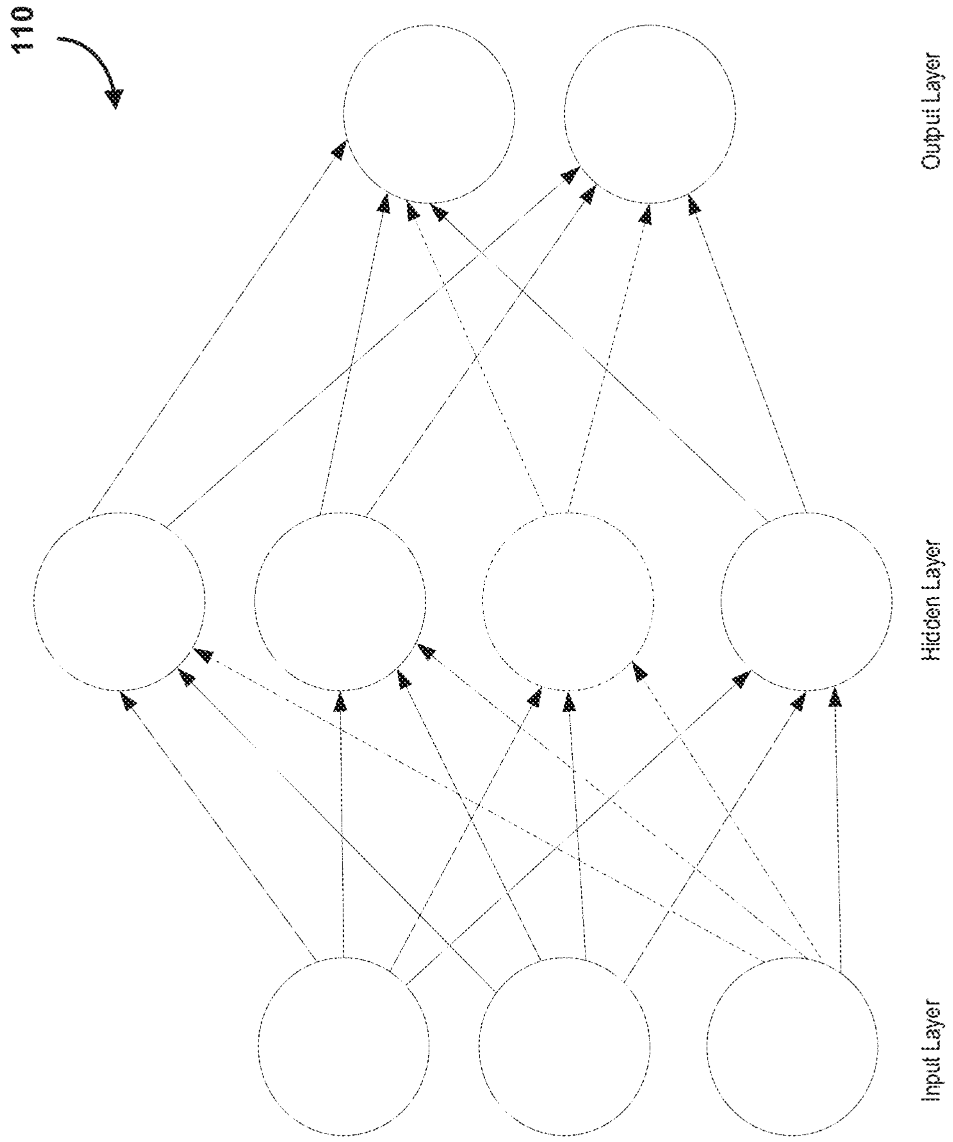
FIG. 2B is a schematic diagram of an example neural network, in accordance with an embodiment.

FIG. 2B is a schematic diagram of an example neural network 110, in accordance with an embodiment. The example neural network 110 can include an input layer, a hidden layer, and an output layer. The neural network 110 processes input data using its layers based on reinforcement learning, for example.

Figure 3A:
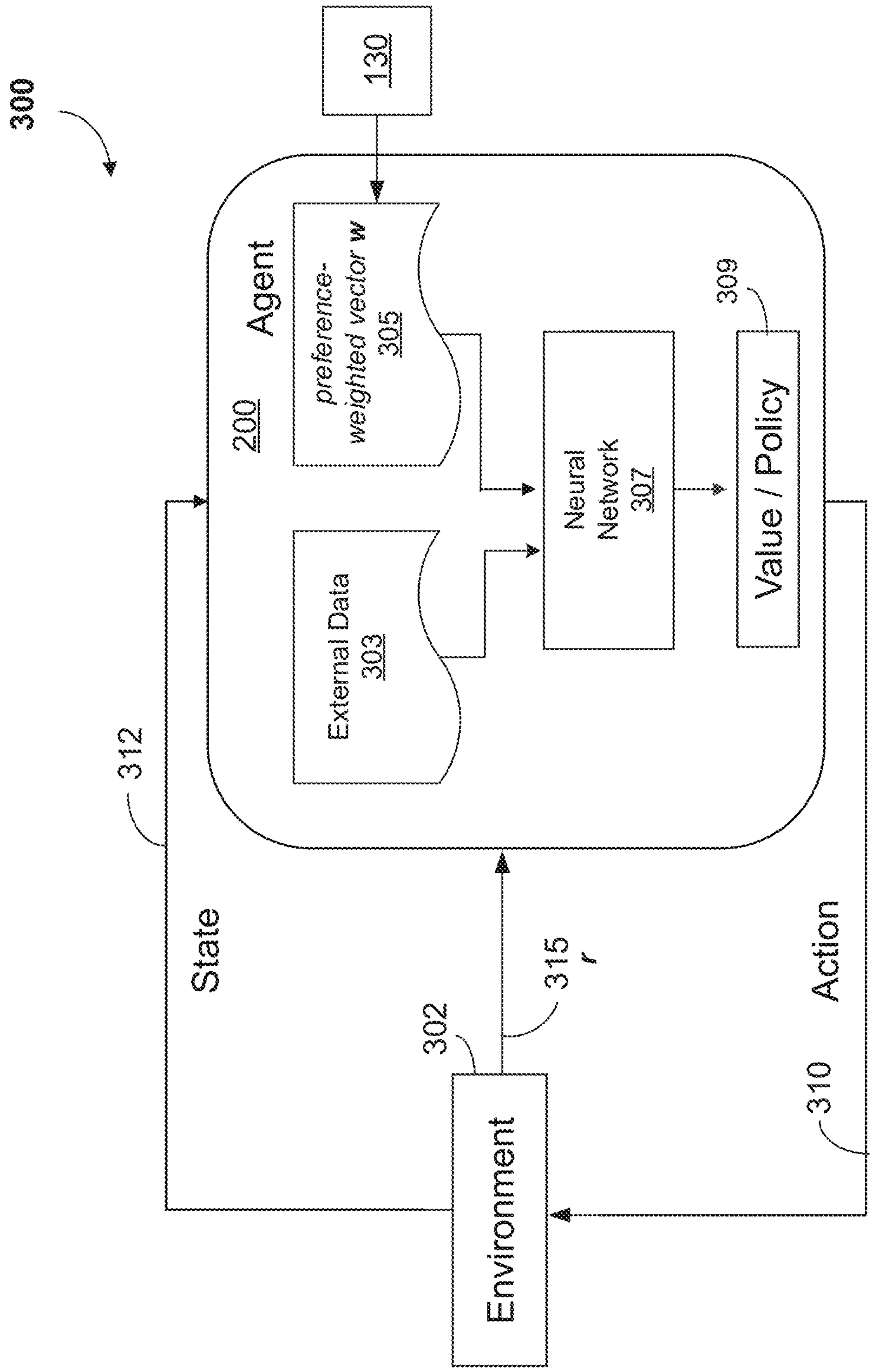
FIG. 3A is a schematic diagram of an automated agent with multiple user objectives, in accordance with an embodiment.

Referring to FIG. 3A, reinforcement learning subsystem 300 includes an automated agent 200, which acts on information from an environment 302 and from interface application 130. In the depicted embodiment, subsystem 300 is implemented at system 100. Accordingly, system 100 stores in memory 108 executable code for implementing the functionality of subsystem 300, for execution at processor 104. In other embodiments, subsystem 300 may be implemented separately from system 100, e.g., at a separate computing device. Subsystem 300 may send data to automated agents 200 (e.g., input data) and receive data from automated agents 200 (e.g., policy data), by way of network 140.

Reinforcement learning is a category of machine learning that configures agents, such the automated agents 200 described herein, to take actions in an environment 302 to maximize a notion of a reward. The processor 104 is configured with machine executable instructions to instantiate an automated agent 200 that maintains a reinforcement learning neural network 110 (also referred to as a reinforcement learning network 110 for convenience), and to train the reinforcement learning network 110 of the automated agent 200 using a training unit 118. The processor 104 is configured to use the reward system 126 in relation to the reinforcement learning network 110 actions to generate good signals (e.g., with positive reward) and bad signals (e.g., with negative reward) for feedback to the reinforcement learning network 110.

Each automated agent 200 and neural network 110, 307, 308 are stored and maintained on a technical infrastructure that is adapted to provide a technical benefit of overall increased accuracy and efficiency at inference time.

In some embodiments, the reward system 126 generates good signals and bad signals to minimize Volume Weighted Average Price slippage, for example. Reward system 126 is configured to receive control the reinforcement learning network 110 to process input data, including a plurality of input data representing a plurality of user objectives, in order to generate output signals. Input data may include trade orders, various feedback data (e.g., rewards), or feature selection data, or data reflective of completed tasks (e.g., executed trades), data reflective of trading schedules, etc. Output signals may include signals for communicating resource task requests, e.g., a request to trade in a certain security. For convenience, a good signal may be referred to as a "positive reward" or simply as a reward, and a bad signal may be referred as a "negative reward" or as a punishment.

In some embodiments, reward may be a reward vector r 315 determined based on at least the preference-weighted vector w 305 (which may be referred to as a weighted vector w 305 throughout the disclosure), taking into account the plurality of user objectives, and their respective weight. The reward vector r 315 may therefore be referred to as a preference-weighted reward vector r 315 throughout the disclosure. The reward vector r 315 may be determined by reward system 126 of system 100. For example, reward system 126 from system 100 can process relevant data, including state data 312, external data 303 and weighted vector 305 to calculate performance metrics, which may be a reward vector r 315, that measure the performance of an automated agent 200, e.g., in a prior time interval.

In some embodiments, the external data 303 may include external information, which may be historical and/or in real-time, received by agent 200. For example, in an example embodiment of implementing the agent 200 and the subsystem 350 for autonomous driving, the external data 303 may include a plurality of vehicle data, which can include historical vehicle data or real-time vehicle data, such as velocity, gas meter, external and internal temperature, total number of drivers in seats, weight of each driver, a location of the vehicle, a traveling direction of the vehicle, and so on. The vehicle data (either historical or real-time) may be obtained from the vehicle's control unit, which receives and stores (or wirelessly transmits such data to a remote server for storage) real time or near real time data from sensors and other parts of the vehicle.

For another example, in an example embodiment of implementing the agent 200 and the subsystem 350 for a heating, ventilation, and air conditioning (HVAC) system of a building, the external data 303 may include a plurality of environmental and operating data, which can include historical HVAC data or real-time HVAC data, such as a current (or historical) temperature of each room and each floor, a maximum and minimum temperature setpoint for each room and each floor, outside air temperature and humidity level, power consumption, energy settings, and so on. The environmental and operating data may be obtained from sensors and control units of the building in real time.

For yet another example, in an example embodiment of implementing the agent 200 and the subsystem 350 for a resource listing or exchange system, the external data 303 may include order and market data (which may be referred to as order and market data 303), which may include prices and volumes of trades relating to the one or more resources through a time duration.

An automated agent 200 maintaining neural network 307, may receive a plurality of input data representing multiple user objectives, external data 303 and state data 312, and in turn generate an action 310 based on a policy 309. The aim of agent 200 is to find the optimal policy 309. Policy 309 is the strategy, which may be a mapping function, that agent 200 employs to determine the next action 310 based on the current state data 312. Policy 309 is used to map states to actions in order to optimize the preference-weighted reward 315. During inference time, at each time step t, the agent 200 may determine the next action 310 based on the current state data 312 and additional input, which may include a preference-weighted vector 305 and may further include external data 303. In some embodiments, either or both of the preference-weighted vector 305 and external data 303 may be processed to become part of current state data 312 prior to the computation of the action 310 by the agent 200. A reward 315 is then computed based on the action 310 and the state data 312, and the agent 200 is trained to maximize or optimize the reward 315.

For example, the policy 309 can be a probability distribution function, which determines that action 310 is to be taken at time t under the state defined by the state data 312, in order to maximize the reward vector r 315.

The action 310 may be a task request, at time t, for a specific resource (e.g., a security), which can be, for example, "purchase X shares of security Y at price Z". The resource task request (or simply task request) in the depicted embodiment may lead to, or convert to an executed order for the specific resource. The executed order can be sent to environment 302, which is the environment of the reinforcement learning framework.

For example, a task request may include:

A: an asset or resource to execute;

V: the amount of asset or resource (e.g., number of shares) the user wishes to buy or sell;

T: the time limit to execute the specified quantity; and w: a weighted vector representing the relative importance or preference of each of the N user objectives.

(A, T, V) is the general specification given to agent 200, and describes the parameters that system 100 sees for an incoming task request. The preference-weighted vector w 305 is an auxiliary input which prescribes the execution agent 200 can perform.

Agent 200 can receive the task request parameters listed above from interface application 130. In some embodiments, input data may include multiple user objectives received from one or more interface applications from one or more user devices. The multiple user objectives may be pre-processed and converted to a weighted vector w 305 including a respective weighted representation of each of the user objectives. In addition, agent 200 may receive additional input data, such as order and market data 303, which may include (A, T, V) as described above. In some embodiments, order and market data 303 may include values of one or more resources, such as prices and volumes of trades relating to the resources at a specific point in time or through a specific time duration.

Figure 5:
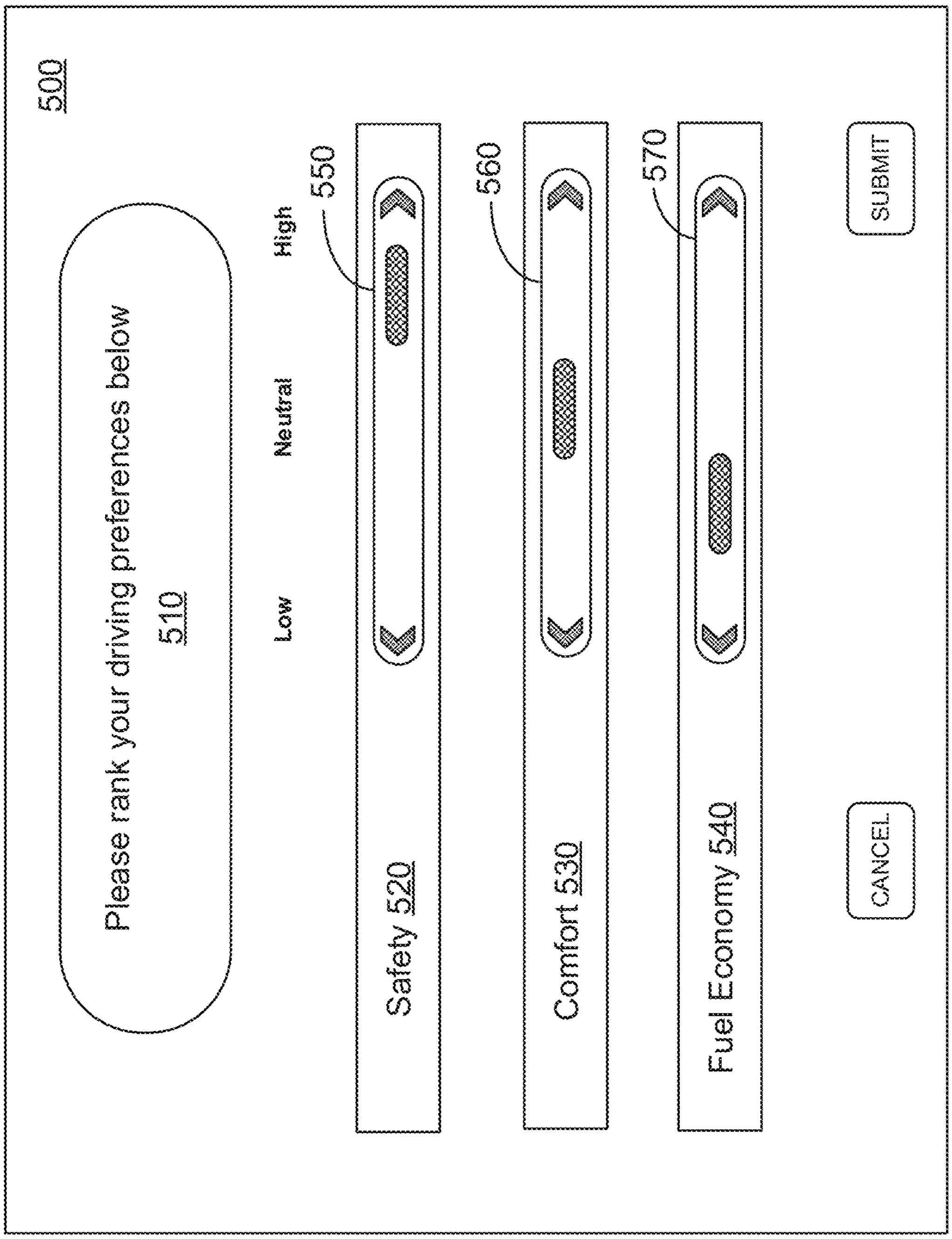
FIG. 5 is an example user interface for receiving multiple user objectives for an automated agent to operate an autonomous or semi-autonomous vehicle, in accordance with an embodiment.
Figure 6:
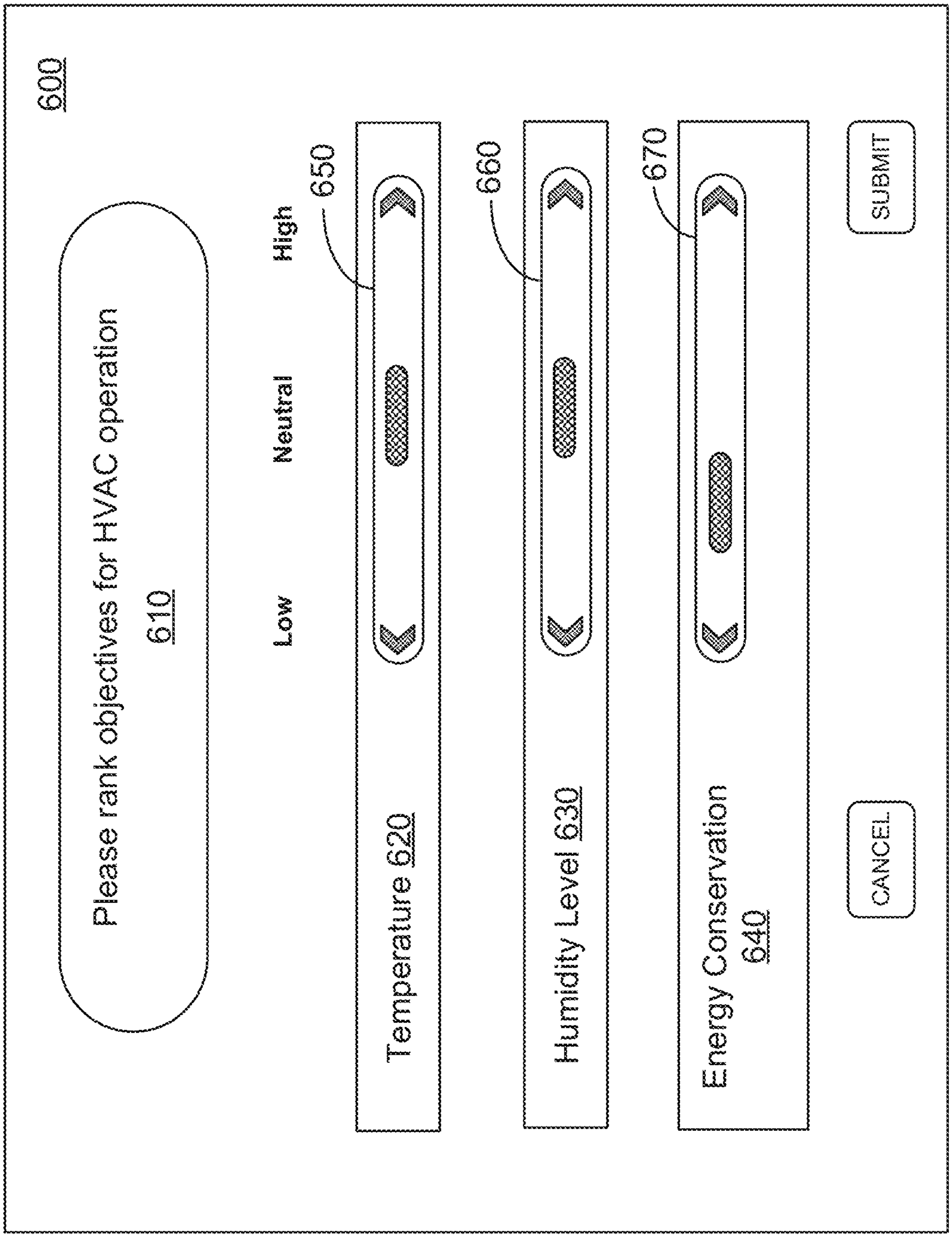
FIG. 6 is an example user interface for receiving multiple user objectives for an automated agent to operate a heating, ventilation, and air conditioning (HVAC) system, in accordance with an embodiment.

In some embodiments, a user application on a user device may render a user interface (UI) 500, 600 as shown in FIGS. 5 and 6. FIG. 5 is an example user interface 500 for receiving multiple user objectives for an automated agent 200 to operate an autonomous or semi-autonomous vehicle, in accordance with an embodiment. The UI 500 may include a first area 510 prompting a user to enter his or her objectives and preferences for a particular task, such as to operate a vehicle by the agent 200, or drive the vehicle with assistance from the agent 200 using neural network 307, 308. The user application may send the received user input to user interface application 130 for transmission to the agent 200 in real time or near real time. The interface application 130 interacts with the system 100 to exchange data (including user objectives input and control commands) and cause to generate visual elements for display at a user interface on the user device.

One or more objective 520, 530, 540 may be shown to the user, each with a respective UI element 550, 560, 570 such as a slider or scroll bar, for indicating a relative level of preference. For example, moving the scroll button within scroll bar 550 to the left may indicate relatively low importance or preference for the objective "safety" 520. Similarly, moving the scroll button within scroll bar 550 to the right may indicate a relatively high importance or preference for the objective "safety" 520. Moving the scroll button within scroll bar 550 to the middle may indicate a neutral importance or preference for the objective "safety" 520. Similarly, the preferences can be set for other objectives such as "comfort" 530 and "fuel economy" 540 using respective scroll button within each scroll bar 560, 570.

Once a user is satisfied with the entered objective settings, he or she may proceed to submit the entered objective settings. Alternatively, the user may cancel the user input and re-start the process, or let the agent 200 enter a default setting for the user objectives 520, 530, 540, which may be pre-determined based on industry standard or a safety standard.

Once the interface application 130 receives the user input data representing a respective importance or preference value for a plurality of user objectives 520, 530, 540, it may transmit the user input data to the agent 200. In some embodiments, the agent 200 or a separate sub-process within the subsystem 350 (not shown) may process the user input data and convert the respective importance or preference value for a plurality of user objectives 520, 530, 540 to a preference-weighted vector w 305.

For example, if the received user input from the interface application 130 includes a high preference for a first objective 520, a neutral preference for a second objective 530, and a low preference for a third objective 540, the corresponding preference-weighted vector w 305 for objectives 520, 530, 540 may be [0.6, 0.3, 0.1].

For another example, if the received user input from the interface application 130 includes a neutral preference for a first objective 520, a neutral preference for a second objective 530, and a low preference for a third objective 540, the corresponding preference-weighted vector w 305 for objectives 520, 530, 540 may be [0.4, 0.4, 0.2].

Note that in these examples, in the context of user objective input data, "high" may be analogous to "aggressive" and "low" may be analogous to "passive".

FIG. 6 is an example user interface 600 for receiving multiple user objectives for an automated agent to operate a heating, ventilation, and air conditioning (HVAC) system, in accordance with an embodiment. The UI 600 may include a first area 610 prompting a user to enter his or her objectives and preferences for a particular task, such as to operate a HVAC system by the agent 200 using neural network 307, 308. The user application may send the received user input to user interface application 130 for transmission to the agent 200 in real time or near real time.

One or more objective 620, 630, 640 may be shown to the user, each with a respective UI element 650, 660, 670 such as a slider or scroll bar, for indicating a relative level of preference. For example, moving the scroll button within scroll bar 650 to the left may indicate relatively low importance or preference for the objective "temperature" 620. Similarly, moving the scroll button within scroll bar 650 to the right may indicate a relatively high importance or preference for the objective "temperature" 620. Moving the scroll button within scroll bar 650 to the middle may indicate a neutral importance or preference for the objective "temperature" 620. Similarly, the preferences can be set for other objectives such as "humidity level" 630 and "energy conservation" 640 using respective scroll button within each scroll bar 660, 670.

Once a user is satisfied with the entered objective settings, he or she may proceed to submit the entered objective settings. Alternatively, the user may cancel the user input and re-start the process, or let the agent 200 enter a default setting for the user objectives 620, 630, 640, which may be pre-determined based on industry standard.

Once the interface application 130 receives all the user input data representing a respective importance or preference value for a plurality of user objectives 620, 630, 640, it may transmit the user input data to the agent 200. In some embodiments, the agent 200 or a separate sub-process within the subsystem 350 (not shown) may process the user input data and convert the respective importance or preference value for a plurality of user objectives 620, 630, 640 to a preference-weighted vector w 305.

For example, if the received user input from the interface application 130 includes a high preference for a first objective 620, a low preference for a second objective 630, and a low preference for a third objective 640, the corresponding preference-weighted vector w 305 for objectives 620, 630, 640 may be [0.8, 0.1, 0.1].

For another example, if the received user input from the interface application 130 includes a high preference for a first objective 620, a neutral preference for a second objective 630, and a neutral preference for a third objective 640, the corresponding preference-weighted vector w 305 for objectives 620, 630, 640 may be [0.6, 0.2, 0.2].

At each time step, information, including real time or near real time information, from environment 302 may be processed by a feature extraction unit 112 (see e.g., FIG. 1) of system 100 to compute a feature data, or also known as a feature data structure, including a variety of features for the given resource (e.g., security). The feature data (or feature data structure) can represent a task request, such as further elaborated below in connection with a lunar lander game or a chatbot.

In some embodiments, an example feature from the feature data structure can include pricing features, volume features, time features, Volume Weighted Average Price features, market spread features. The feature data may relate to a single feature, i.e., data for a specific feature relevant to a given resource. When the resource is a security, the feature may be, as a non-limiting example, the volatility, a mid-point price, or a market spread of the security.

These features may be processed to compute a state data 312, which can be a state vector, or a state data structure. The state data 312 may be used as input to train the automated agent(s) 200. Some of the features may also be processed to become part of order and market data 303.

In some embodiments, order and market data 303 received by agent 200 may further include contents of an order book (e.g., limit order book), feature-engineered trading signals, and historical market features with respect to the asset or resource associated with the task request. For example, order and market data 303 can include data relating to tasks completed in a given time interval (e.g., $t_1$ to $t_2$, $t_2$ to $t_3$, . . . , $t_{n-1}$ to $t_n$) in connection with the asset or resource. For example, order and market data 303 may include trades of a given security in the time interval. In this circumstance, order and market data 303 can include values of the given security such as prices and volumes of trades. In some embodiment, order and market data 303 can include values for prices and volumes for tasks completed in response to previous requests (e.g., previous resource task requests) communicated by an automated agent 200 and for tasks completed in response to requests by other entities (e.g., the rest of the market). Such other entities may include, for example, other automated agents 200 or human traders.

In some embodiments, each time interval (i.e., time between each of $t_1$ to $t_2$, $t_2$ to $t_3$, $t_{n-1}$ to $t_n$) is substantially less than one day. In one particular embodiment, each time interval has a duration between 0-6 hours. In one particular embodiment, each time interval has a duration less than 1 hour. In one particular embodiment, a median duration of the time intervals is less than 1 hour. In one particular embodiment, a median duration of the time intervals is less than 1 minute. In one particular embodiment, a median duration of the time interval is less than 1 second.

As will be appreciated, having a time interval substantially less than one day provides opportunity for automated agents 200 to learn and change how task requests are generated over the course of a day. In some embodiments, the duration of the time interval may be adjusted in dependence on the volume of trade activity for a given trade venue. In some embodiments, duration of the time interval may be adjusted in dependence on the volume of trade activity for a given resource.

In some embodiments, when there is a plurality of objectives, the plurality of objectives may be represented using a weighted vector w 305. The reward vector r 315 is determined based on the weighted vector w 305. Each respective weighted reward in a scalar reward R has its corresponding preference or weight in a preference-weighted vector, w. Each preference weight can be determined based on simulation results, user input flow characteristics, and actual trading performance. This may also be done on a symbol by symbol case.

In some embodiments, the preference-weighted reward vector r 315 is then calculated as $w^T$ r. The preference-weighted reward vector r 315 (which can also be written as $\vec{r}$) can include a plurality of weighted rewards, each respective weighted reward being related to a respective objective (e.g., a respective user objective) having a respective weight or preference from the preference-weighted vector, w. For example, consider three distinct user objectives A, B, C with respective preference weights of 0.2, 0.5, 0.3 and respective scalar rewards $R_A$, $R_B$, $R_C$, then w can be determined as [0.2, 0.5, 0.3], final scalar reward R would be $0.2R_A+0.5R_B+0.3R_C$, and the reward vector is $r=[0.2R_A, 0.5R_B, 0.3R_C]$.

In some embodiments, the plurality of user objectives for an automated agent 200 can have some level of conflict with each other. The training engine 118 may be configured to handle different and even competing user objectives by modulating weights associated with different objectives. A user objective may include a weight indicating its relative importance or preference, aggressiveness or urgency using a weight value (e.g., "prefer a robot to drive safely at weight of 0.9"). A plurality of user objectives may be associated with a plurality of weights, with each objective being associated with a respective weight from the plurality of weights. The sum of the plurality of weights across all user objectives for a given resource task request or a given action may add up to 1. In some embodiments, the plurality of objects with plurality of weights may be converted to a preference-weighted vector, w 305.

For example, consider two distinct user objectives X and Y with respective weights of 0.2, 0.8, the corresponding preference for the two user objectives may be [0.2X, 0.8Y], with the preference-weighted vector w 305 being [0.2, 0.8].

For another example, consider three distinct user objectives X, Y, Z with respective weights of 0.2, 0.3, 0.5, the corresponding preference for the three user objectives may be [0.2X, 0.3Y, 0.5Z, with the preference-weighted vector w 305 being [0.2, 0.3, 0.5].

Taking two separate preferences, both of them may relate to the same set of user objectives. For example, preference PR1 may be [0.2X, 0.8Y], and preference PR2 may be [0.8X, 0.2Y]. The first preference PR1 may be referred to as a passive preference and the second PR2 may be referred to as an aggressive preference. The passiveness or aggressiveness may be relatively defined. In some embodiments, if a preference PR3 has very similar or identical weights for two user objectives, such as [0.5X, 0.5Y] or [0.4X, 0.6Y], the preference PR3 may be said to be a neutral. The threshold for neutral may be predefined.

In an example of autonomous driving, a pair of preferences PR1 and PR2 may be received from two drivers of the same vehicle. Each preference of PR1 and PR2 includes at least two weighted objectives. PR1 can be a preference that has a weight of 0.1 for objective A (e.g., "speed") and 0.9 for objective B (e.g., "safety"), while PR2 can be a preference that has a weight of 0.9 for objective A (e.g., "speed") and 0.1 for objective B (e.g., "safety"). PR1 may be viewed as passive while PR2 may be viewed as aggressive.

In some embodiments, the reinforcement learning neural network 110, 307 maintained by an agent 200 may be one of: a Feed Forward Neural Networks (FFNN), a deep network such as multi-layer perceptron (MPL), a recurrent neural network (RNN), or an asynchronous actor critic (A3C) neural network.

In some embodiments, an example loss functions are dependent on the type of reinforcement learning neural network (RLNN) 307. A loss function may calculate a loss based on a number of variables, including the reward vector r 315 (which can also be written as $\vec{r}$).

For example, when the RLNN 307 is implemented based on a value based algorithm, a value loss may be calculated. For example, this is the loss function in Deep Q Learning (DQN) may be:

$$L = E\left[\left(R + \gamma \max_{a'} Q(s', a'; \theta_k) - Q(s, a; \theta_k)\right)^2\right]$$

In some embodiments, with a value-based multiple objective reinforcement learning neural network, the optimal Q-value (target) can be preference-weighted in the form below:

$$Q_{\vec{w}}(s, a) = E\left[\vec{w} \cdot \vec{r}(s, a) + \gamma \max_{a'} Q_{\vec{w}}(s', a') | s, a\right]$$

In some embodiments, with a policy-based multiple objective reinforcement learning neural network, an example of using the standard policy gradient optimization with the advantage estimate scaled by the preference weight gives an action A based on:

$$A = w^T(y - V(s|w; \theta))$$

Intuitively, the above equation encourages the agent 200 to take actions which improve the expected cumulative preference-weighted reward.

In some embodiments, with an asynchronous actor critic (A3C) neural network, there may be provided a benefit of combining value-based and policy based network together. For example, in a multiple objective reinforcement learning neural network, similar loss functions as above may be implemented to compute the actor loss and critic loss separately.

Figure 8A:
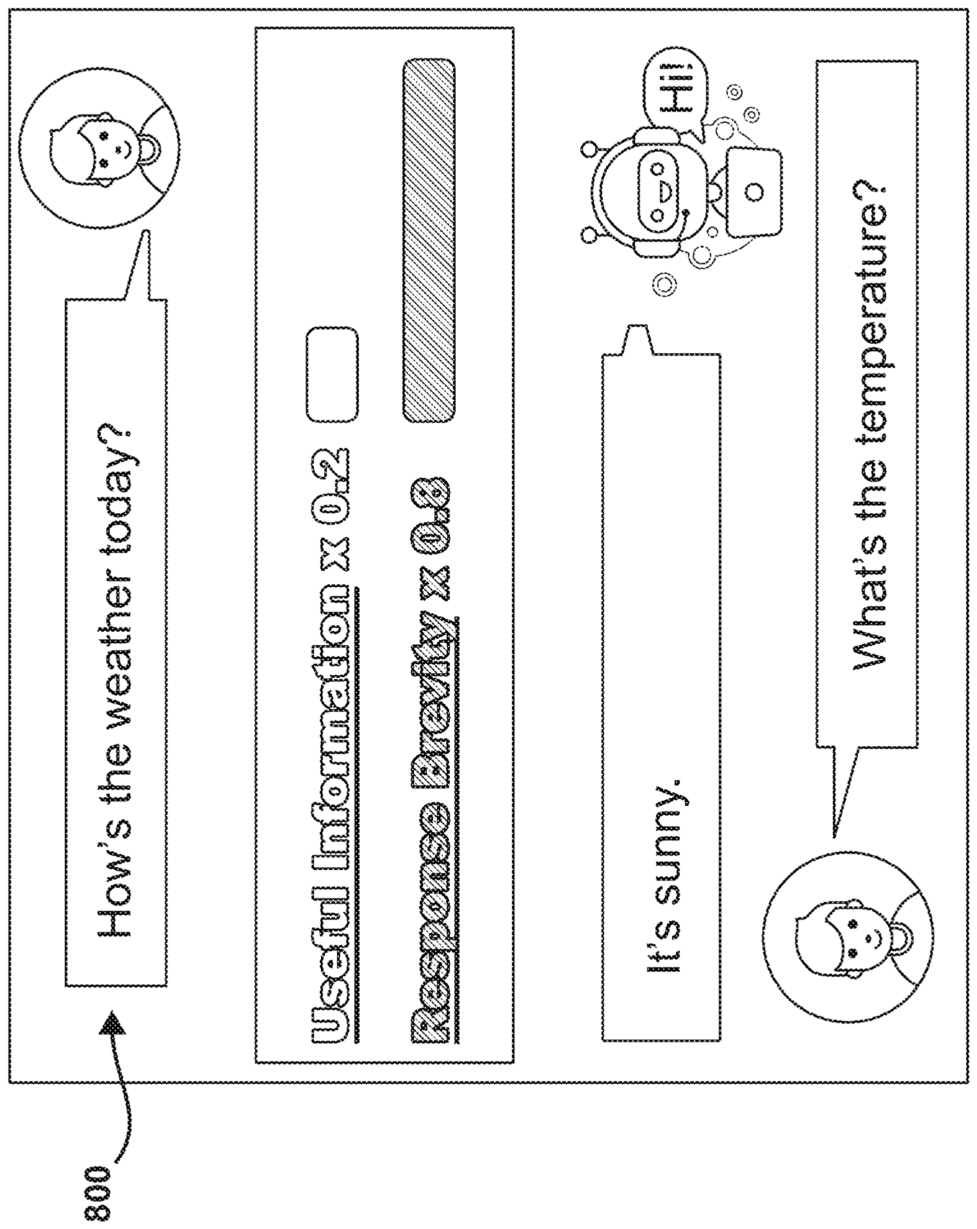
FIGS. 8A and 8B each shows a screen shot of a chatbot implemented using an automated agent, in accordance with an embodiment.

The multiple objective (MO) reinforcement learning neural network may be implemented to solve a practical problem where competing interests may exist in a task request. For example, referring now to FIG. 8A, when a chatbot is required to respond to a first query such as "How's the weather today?", the chatbot may be implemented to first determine a weighted or ranked list of competing interests or objectives. A first objective may be usefulness of information, a second objective may be response brevity. The chatbot may be implemented to, based on the query 800, determine that usefulness of information has a weight of 0.2 while response brevity has a weight of 0.8. Therefore, the chatbot may proceed to generate an action (a response) that favours response brevity over usefulness of information based on a ratio of 0.8 to 0.2. Such a response may be, for example. “It’s sunny.”

Figure 8B:
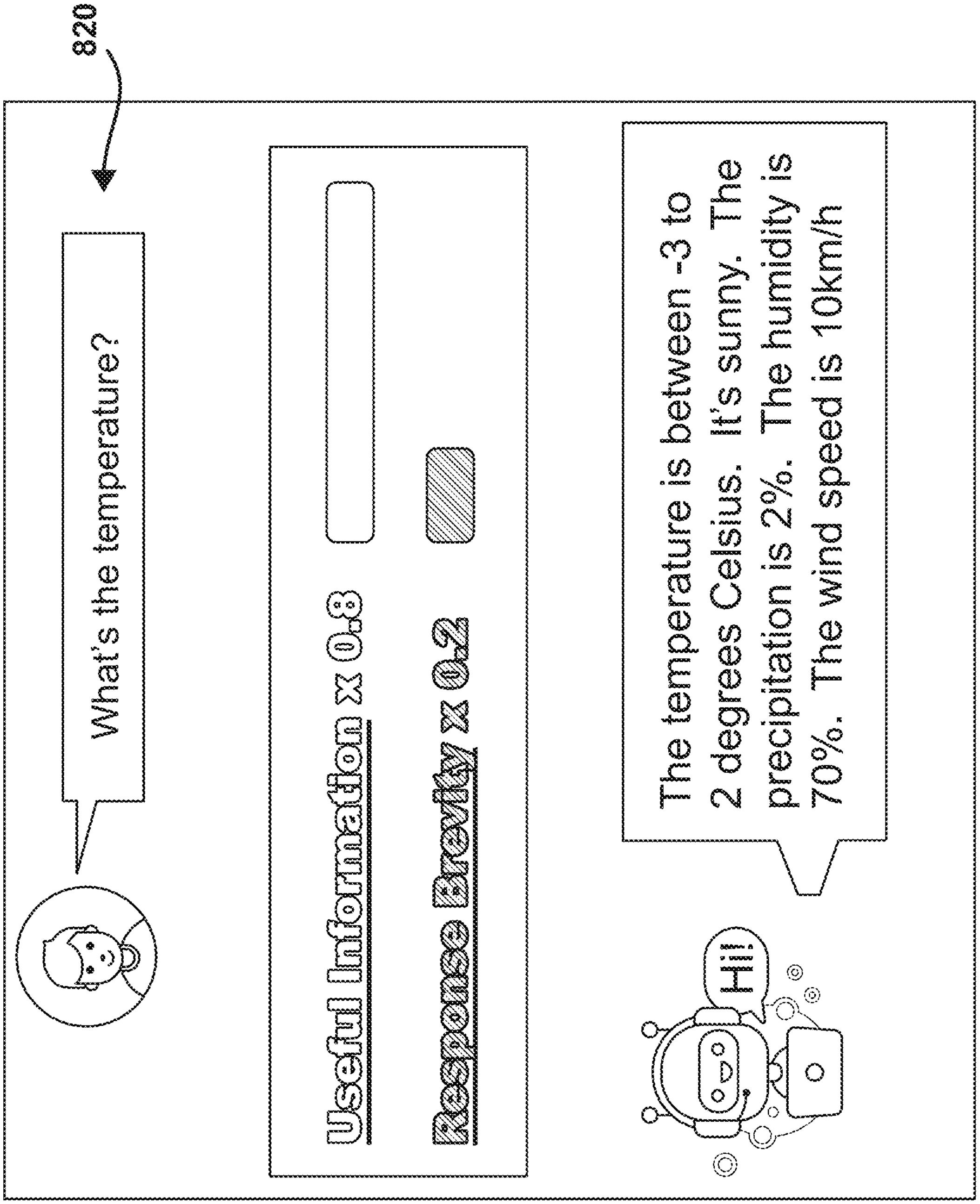

For another example, referring now to FIG. 8B, when the same chatbot is required to respond to a second query 820 such as “What’s the temperature?”, the chatbot may be implemented to again determine a weighted or ranked list of competing interests or objectives. For this task or query, the first objective may still be usefulness of information, a second objective may be response brevity. The chatbot may be implemented to, based on the query 820, determine that usefulness of information has a weight of 0.8 while response brevity has a weight of 0.2. Therefore, the chatbot may proceed to generate an action (a response) that favours usefulness of information over response brevity based on a ratio of 0.8 to 0.2. Such a response may be, for example. “The temperature is between −3 to 2 degrees Celsius. It’s sunny. The precipitation is 2% . . . ”.

Figure 9A:
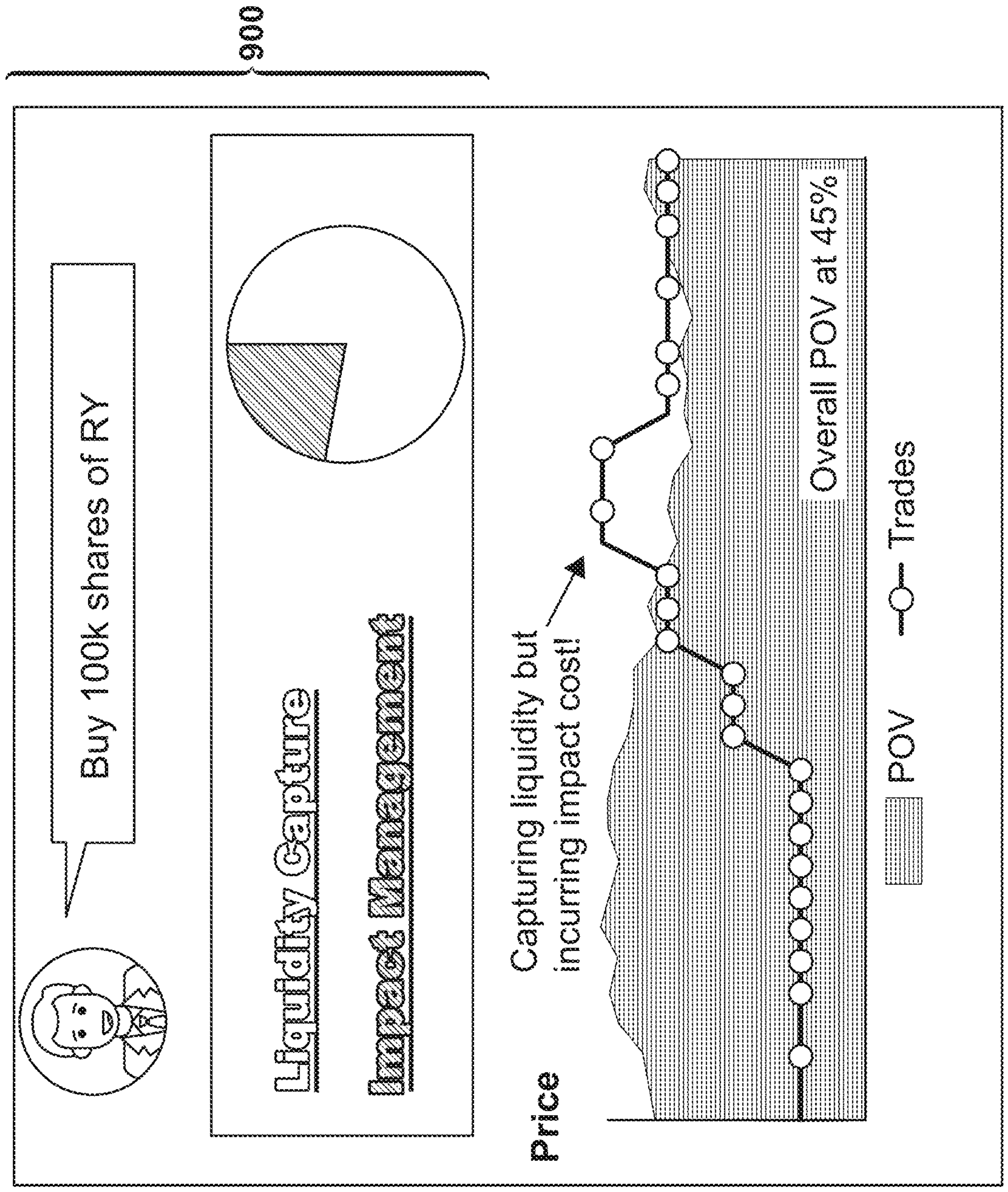
FIGS. 9A and 9B each shows a screen shot of an automated stock trading agent implemented using an automated agent, in accordance with an embodiment.

As another example, FIG. 9A shows a screen shot of an automated stock trading agent implemented using an automated agent 200, in accordance with an embodiment. The stock trading agent may receive a task request, which is to buy 100,000 shares of a particular resource or stock RY. A the same time, the agent 200 may receive or otherwise determine a set of user objectives 900, which may include for example, liquidity capture and impact management. Among the set of user objectives 900, liquidity capture may have the highest weight or preference, while impact management has the second highest weight, followed by the weight of execution benchmarks, and then lastly, weight of the consistency. These different user objectives with respective weights are then processed into a weighted vector 305, which is used by the agent 200 to execute the task request, resulting in an aggressive execution style that captures liquidity but could incur large amount of impact cost.

Figure 9B:
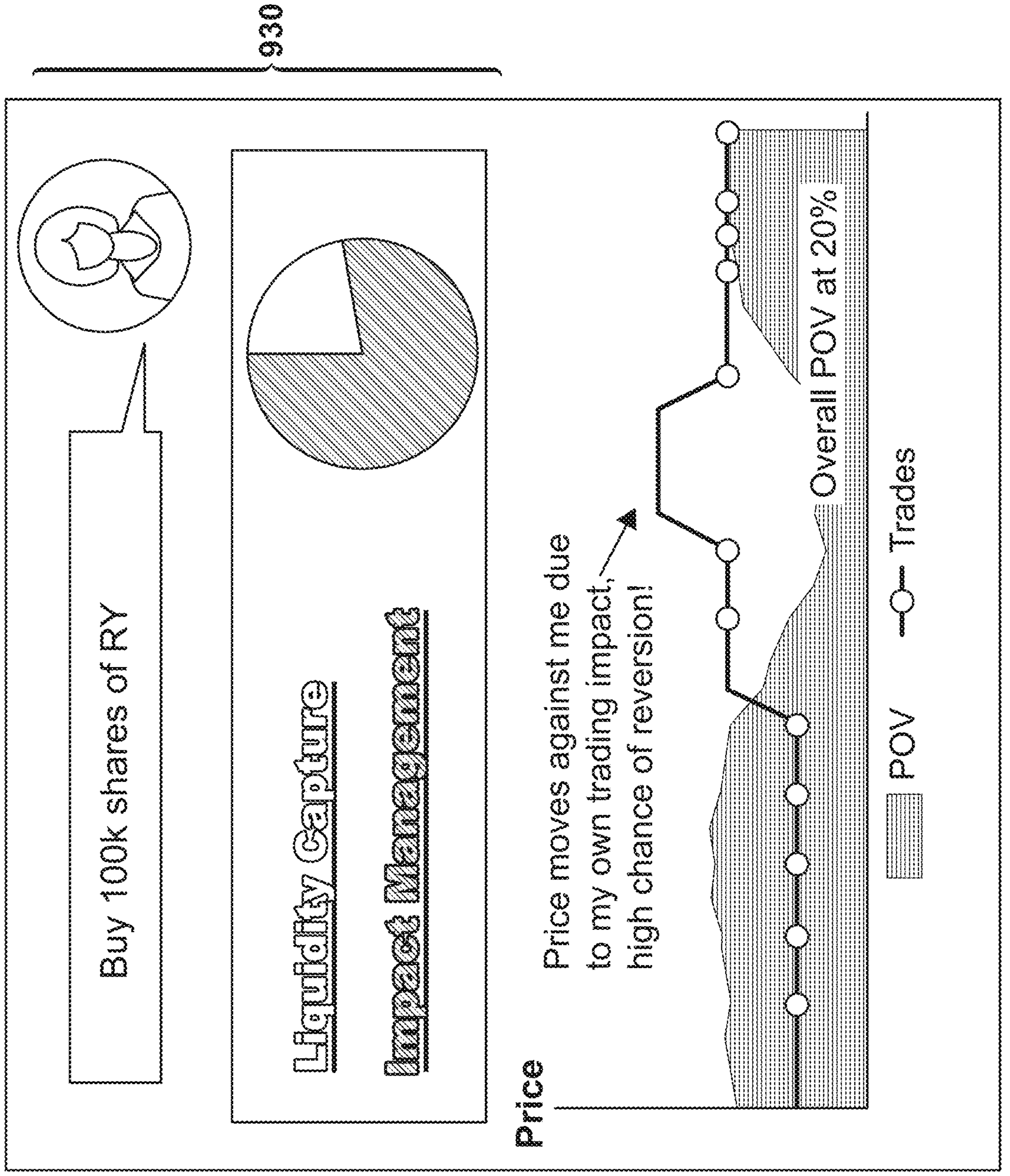

The same agent 200 may in a different transaction, as shown in FIG. 9B, receive the same task request, buying 100,000 shares of a particular resource or stock RY, from a different user. A the same time, the agent 200 may receive or otherwise determine a set of user objectives 930, which may include for example, liquidity capture, impact management, execution benchmarks, and consistency. Among the set of user objectives 930, impact management may have the highest weight or preference, while liquidity capture has the second highest weight, followed by the weight of execution benchmarks, and then lastly, weight of the consistency. These different user objectives with respective weights are then processed into a weighted vector 305, which is used by the agent 200 to execute the task request, resulting in a passive execution style that focuses on managing market impact and would slow down to wait for reversion after the agent’s own trading.

In some embodiments, a user may execute a certain number of units of an asset or resource within a specified time window, seeking to optimize the achieved prices relative to a specified benchmark. In some cases, there may be explicit benchmark to guide the transaction: for example, using a liquidity seeking formulation, or other non-schedule based execution algorithms.

However, in cases where there is no explicit benchmark, agent 200 may be implemented to perform optimization over multiple, possibly conflicting, general objectives (e.g., trading objectives). For example, agent 200 may look to optimize for a combination of:

A desired or good price according to specific trading benchmarks;

Minimal Market Impact and Footprint; and

Liquidity Capture.

In the above example, there is clear interaction between the different objectives. For example, achieving good arrival (AP) slippage would generally correspond to lower market impact. The interaction can also be conflicting. For example, maximizing liquidity capture would in most cases push price away and result in greater trading impact.

In addition, different users may have different preferences for these objectives. For example, User A may care more about minimizing market impact, whereas User B may value getting liquidity more, such as shown in FIGS. 7A and 7B.

Historically, different user objectives may be processed by developing a suite of rule-based algorithms that collectively span the set of behaviors that a client or user may demand. However, in the push for more powerful, adaptive and proactive automated systems, artificial intelligence, and reinforcement learning in particular, may be used to implement agent 200 for faster and more efficient decision making and execution. Unfortunately, the standard Markov Decision Process (MDP) formulation taken in reinforcement learning, which optimizes for a scalar reward, is not sufficient to handle the large set of execution styles that sophisticated users may demand, and as such, these systems are typically limited to situations where there is a single, well-defined execution benchmark.

The Multi-Objective Reinforcement Learning (MORL) neural network system outlined herein overcomes these limitations. By leveraging the reinforcement network such as an asynchronous actor critic (A3C) architecture, a single goal-conditioned deep recurrent network, and a proximal policy optimizer, the model, such as implemented by system 100, learns a set of control policies over the space of all possible linear preferences for a set of trading objectives.

This makes it possible to personalize execution for each user, while getting the benefits of an adaptive, AI-powered trading system. The system 100 and subsystem 300 are configured to leverage the features, distributed learning, and asynchronous inference modules, while expanding on the existing network architecture, memory mechanism, and learning algorithm to accommodate the problem setting described above.

In some embodiments, an example MORL algorithm assumes a set of N user objectives, each parameterized by a scalar reward r. The algorithm may be based on a specific task request, which may include:

A: an asset or resource to execute;

V: the amount of asset or resource (e.g., number of shares) the user wishes to buy or sell;

T: the time limit to execute the specified quantity; and w: a weighted vector representing the relative importance of the N user objectives.

(A, T, V) is the general specification given to agent 200, and describes the parameters that system 100 sees for an incoming task request. The preference-weighted vector w 305 is an auxiliary input which prescribes the execution agent 200 can perform.

At a high level, agent 200 continuously decides the placement of limit orders as a function of real time market micro-structure data, conditioned on the preference-weighted vector w for a given order. The neural network 307 can be trained using an asynchronous policy gradient algorithm, by sampling user requests or orders (A, V, T, w), where (A, V, T) is sampled based on the distribution of historical completed user requests or orders, and w is sampled from the standard N-simplex. The objective for each such order reduces to optimizing for the utility, i.e. the preference-weighted reward r 315.

In some embodiments, when there is a plurality of objectives, the reward can be a vector, r. Each respective weighted reward in the reward vector r has its corresponding preference in a preference-weighted vector, w. Therefore, the preference-weighted reward r 315 is then calculated as $w^T r$. The preference-weighted reward 315 can include a plurality of weighted rewards, each respective weighted reward being related to a respective objective (e.g., a respective user objective) having a respective weight or preference from the preference-weighted vector, w.

A sufficiently feature rich input space derived from an environment 302 allows the neural network 307 to take meaningful actions in the market, and a neural network architecture which conditions on the preference-weighted vector w ensures that execution optimizes for the N trading objectives in a way that's aligned with the task request. A specific loss formulation grounded in multi-objective optimization theory, improves sample efficiency, and generalization in preference space.

The trained agent 200 can serve as a personalized execution algorithm for trading: when a user request including a resource order (A, V, T, w) is received, agent 200 executes the order according to the preference-weighted vector, w 305.

The neural network 307 may receive two sources of inputs. The first input may include external data 303 such as order and market data 303, which may include contents of a limit order book, feature-engineered trading signals, and historical market features with respect to the order asset A. The second input may include a preference-weighted vector w 305, which may be generated based on user input, and once determined, remains fixed throughout the processing and execution of the task request. The second input weighted vector w 305 may be concatenated with a latent representation of environment 302, and passed to the neural network 307. Intuitively, the latent representation encodes a dense, information rich representation of the market environment 302, and should be agnostic to the execution style of a task request. In an example A3C network implementation, by conditioning the actor network and critic network on the preference-weighted vector w 305, a smooth policy shift can be configured as a function of w, meaning that similarity in preference space can translate to similar policy execution; and users can expect execution styles that are alike, for preferences that are close.

The trainable parameters of neural network 307 can be grouped into three blocks. The first, and most computationally heavy, is a deep recurrent network, which propagates a high-dimensional market state through a sequence of fully connected and LSTM layers, and outputs a dense latent representation for the preference-conditioned actor and critic networks. The actor and critic networks each take as input the latent representation, and the weighted vector w 305, and output a preference-conditioned distribution over the action space, and preference-conditioned vector value estimate respectively.

Figure 3B:
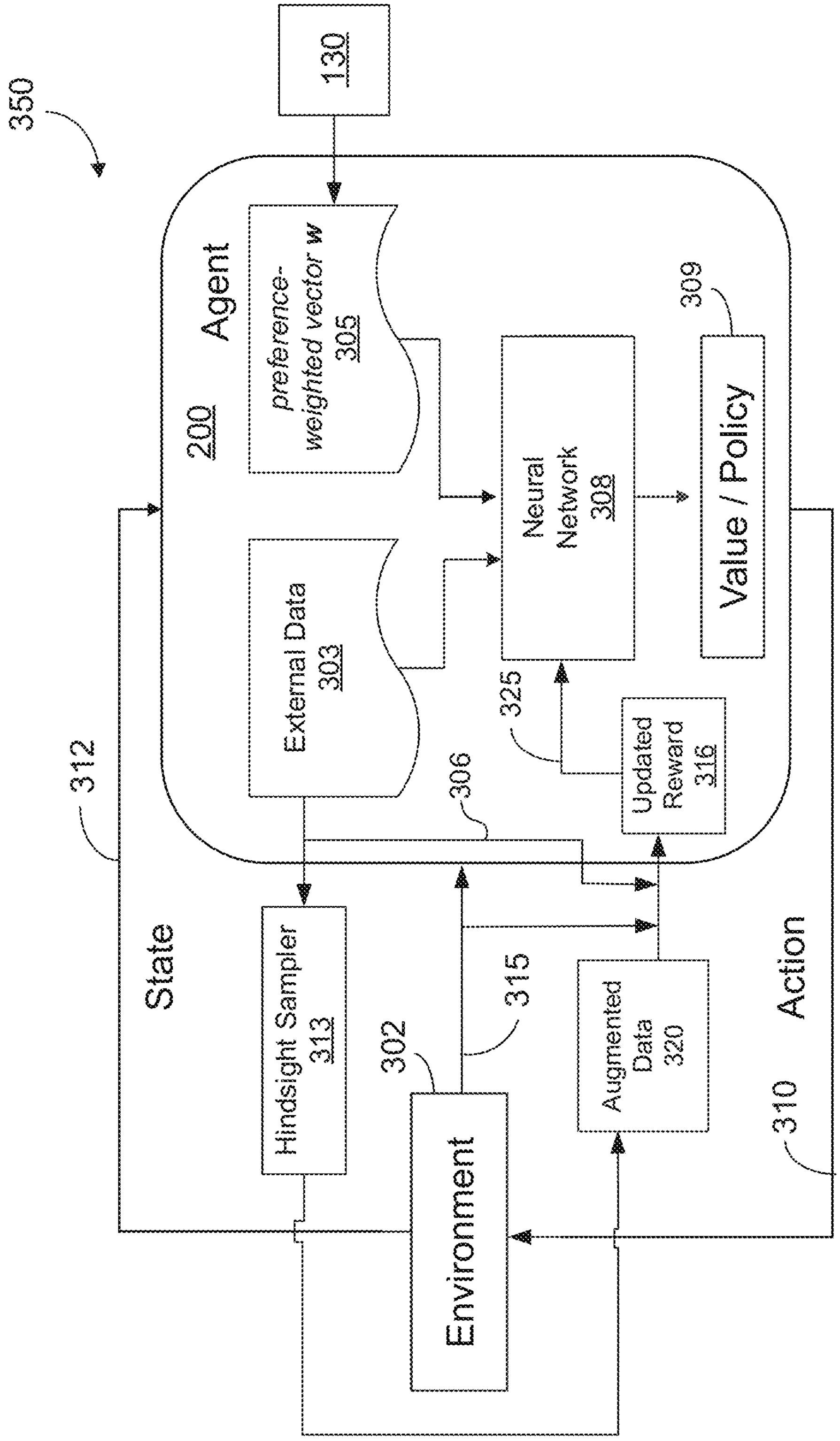
FIG. 3B is a schematic diagram of an automated agent with multiple user objectives and a hindsight sampler, in accordance with an embodiment.

FIG. 3B is a schematic diagram of an automated agent 200 being trained with multiple user objectives and a hindsight sampler module 313 in a subsystem 350, in accordance with an embodiment. The hindsight sampler module 313 may receive, from external data 303, historical information regarding a specific resource associated with the current task request at inference. The historical information may include, for example, a set of historical task data for the specific resource, which may include one or more of: at least one historical state data for the specific resource, a plurality of corresponding historical user objectives, and at least one historical action output for the at least one historical state data. Part of the set of historical task data, in each iteration, may be concatenated with the preference-weighted vector w 305 to form augmented data 320, which is then used to compute an updated reward based on the augmented data 320.

For example, augmented data 320 may be generated by concatenating one or both of the at least one historical state data and the at least one historical action output with the preference-weighted vector w 305. The updated reward may be used to compute an updated loss 325 using a loss function, and parameters of the reinforcement learning neural network 308 may be tuned based on the updated loss 325.

In some embodiments, subsystem 350 in FIG. 3B may in some embodiment be implemented with asynchronous advantage actor-critic (A3C) network, where multiple actor neural networks are trained in parallel, each receiving a continuous series of task requests (A, T, V, w), executing each task request, and sending a batch of data D=(S, A, r, w) to the neural network 307. The batch of data D may include:

S: a batch of real time market data inputs at each time step

A: action taken by the agent 200 during inference process at each time step r: a vector of N rewards received at each time step, N being the number of user objectives w: the preference-weighted vector 305 associated with each user input in the data batch The weights of neural network 307, 308 get synced from the agent 200 periodically. Agent 200 may receive incoming batch data D from each inference process over a network, and performs a proximal policy style update on each inference process.

To promote sample efficient learning of the set of execution policies, and as a form of implicit curriculum, the multi-objective algorithm in subsystem 350 may use a hindsight sampler subsystem 313, referred to as a hindsight sampler 313.

In some embodiments, the hindsight sampler 313, during each inference process, samples a set of auxiliary preferences $\{PR_1', PR_2' \ldots PR'_N\}$ from external data 303, processes the set of auxiliary preferences into the form of a historical auxiliary preference-weighted vector w' 306, and for each, evaluates the actions taken under the current preference-weighted vector w 305. Intuitively, this mechanism helps provides a continuous learning signal for all possible user objectives the agent 200 learns. Moreover, it improves sample efficiency, since agent 200 can learn a significant amount of information for auxiliary preferences $\{PR_1', PR_2' \ldots PR'_N\}$ without needing to be previously trained based on training data containing executed resource tasks having the auxiliary preferences $\{PR_1', PR_2' \ldots PR'_N\}$, which may be different from the current preferences of the user objectives received from the interface application 130.

As an illustrative example ("hindsight example"), a set of user objectives received from interface application 130 and associated with a current resource task may include:

Objective X: Execute at 5% Percentage of Volume (POV), having weight 0.3

Objective Y: Minimize market impact, having weight 0.7

The corresponding preference-weighted vector w 305 can be [0.3, 0.7].

Assume agent 200 has only seen training data with preferences that place more weight on the second objective Y (minimization of market impact), as agent 200 learns how to minimize market impact, it will inevitably have experiences trading below, near, and above the target POV of 5%. Hindsight sampler module 313 is configured to evaluate these execution trajectories under preferences that place more weight on the first objective X (e.g., 5% POV), and learn that moments when agent 200 was trading close to 5% POV were more rewarding, and moments when the agent was trading below or above the 5% POV were less rewarding, and update the reward and loss function for agent 200 accordingly. Therefore agent 200 has learned about rewarding execution according to the first objective (e.g., 5% POV), without having prior domain knowledge of historical parent orders associated with the first objective X. When the objectives are conflicting, similar effects can be achieved, except in this situation, agent 200 is likely to learn what not to do, which is just as informative.

The hindsight sampler module 313 may receive, from external data 303, historical information regarding a specific resource associated with the resource task request in action 310. One or more historical task data (e.g., one or more historical executed trade orders of a given resource) from external data 303 (e.g., order and market data 303) may include multiple historical user objectives, similar to the current multiple user objectives received from an interface application 130 of a user device. The multiple historical user objectives may include a corresponding set of auxiliary preferences $\{PR_1', PR_2' \ldots PR'_N\}$ from external data 303, which is processed into a historical auxiliary preference-weighted vector w' 306.

For a given resource associated with the resource task request in action 310, in each inference, part of the set of historical task data may be concatenated with the current preference-weighted vector w 305 to form augmented data 320, which is then used to compute an updated reward r'316 based on the augmented data 320. For example, augmented data 320 may be generated by concatenating one or both of the at least one historical state data and the at least one historical action output with the preference-weighted vector w 305.

The updated reward r' may be determined using a reward function based on the state data 312, the augmented data 320 and the historical auxiliary preference-weighted vector w' 306 from the set of historical task data. The updated reward 316 may be used to compute an updated loss 325 using a loss function, and parameters of the reinforcement learning neural network 308 may be tuned based on the updated loss 325.

The hindsight sampler 313 is configured to, in some embodiments, select specific historical task data from external data 313 to sample historical data having one or more specific user objectives. For instance, the hindsight sampler 313 may be configured to look for historical task data with a set of auxiliary preference(s) that places higher weight on the less-weighted objective(s) from the current preference-weighted vector w 305. Using the hindsight example above, where the current preference-weighted vector w 305 is [0.3, 0.7] for resource task execution, the hindsight sampler 313 may be configured to look for historical task data with a weight of at least 0.4 or above for objective X.

The multi-objective reinforcement learning (MORL) formulation outlined above affects the ecosystem of schedule-based and liquidity seeking based execution algorithm, and allows for a general, semantically meaningful framework for execution.

If a user objective is to optimize for any one particular benchmark, it can be accommodated by the MORL neural network system 100 as part of the multiple objectives sent to agent 200, therefore, users that wish to execute an order with respect to a known, and clearly defined strategy can be accommodated as well.

Since system 100 can be trained using real time or near real time information from a real time stock market, the policies for each preference can adapt to real-time market conditions, and the user has freedom to choose a preference according to their own heuristics, having confidence that system 100 will achieve their definition of good execution, in a current market.

In an A3C implementation of the system 300, 350, the goal of the critic network is to learn the value of each state, which may differ based on the preference w. The critic network uses bootstrapped updates, where future return is approximated by taking an optimistic filter of maximum preference-weighted value over all preferences in the batch. This leads to faster alignment of values estimates, since information about the quality of a state under a preference w', can be immediately evaluated for quality under a different preference w.

Figure 4:
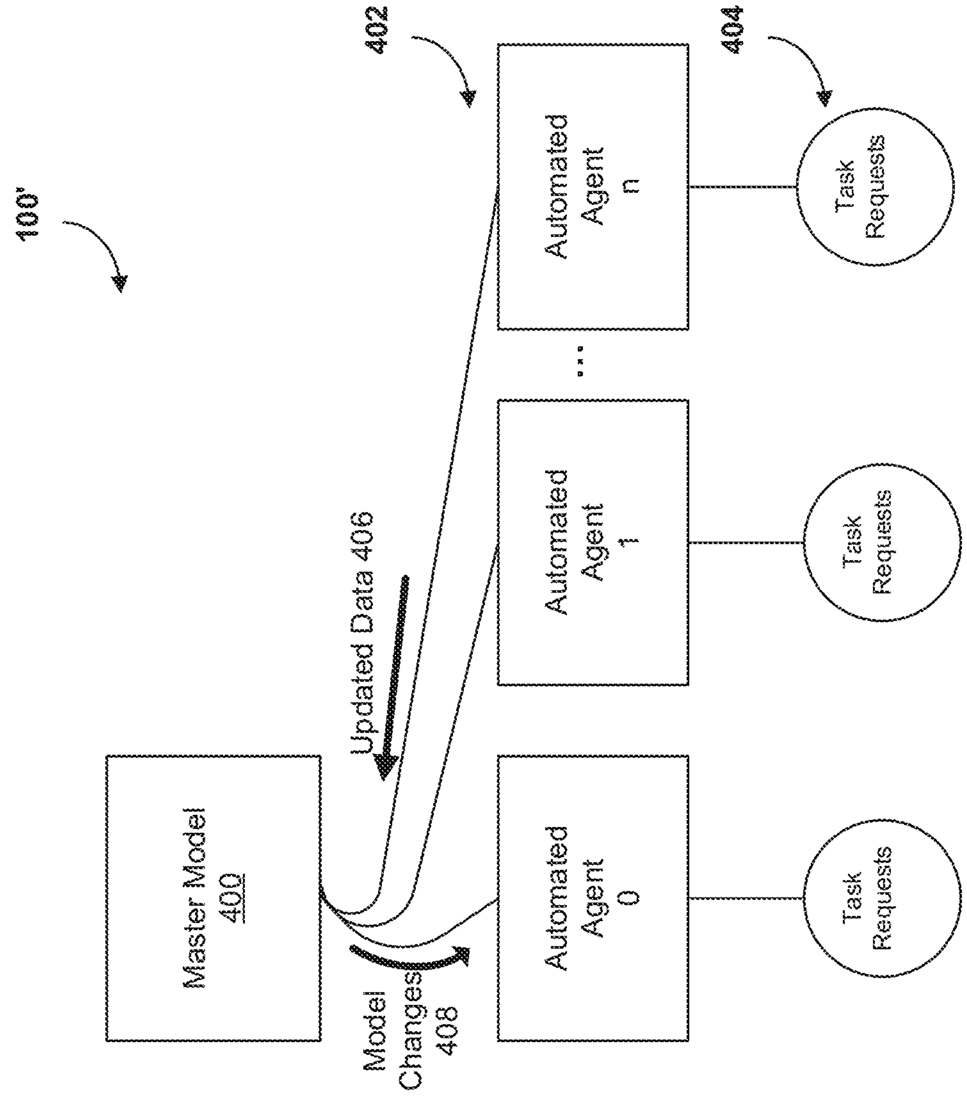
FIG. 4 is a schematic diagram of a system having a plurality of automated agents, in accordance with an embodiment.

FIG. 4 depicts an embodiment of system 100' having a plurality of automated agents 402. Each of the plurality of automated agents 402 may function as an automated agent 200 in the system 100. In this embodiment, data storage 120 stores a master model 400 that includes data defining a reinforcement learning neural network for instantiating one or more automated agents 402.

During operation, system 100' instantiates a plurality of automated agents 402 according to master model 400 and performs operations depicted in FIG. 8 for each automated agent 402. For example, each automated agent 402 generates tasks requests 404 according to outputs of its reinforcement learning neural network 110, 307, 308.

As the automated agents 402 learn during operation, system 100' obtains updated data 406 from one or more of the automated agents 402 reflective of learnings at the automated agents 402. Updated data 406 includes data descriptive of an “experience” of an automated agent 402 in generating a task request. Updated data 406 may include one or more of: (i) input data to the given automated agent 402 and applied normalizations (ii) a list of possible resource task requests evaluated by the given automated agent with associated probabilities of making each requests, and (iii) one or more rewards for generating a task request.

System 100' processes updated data 406 to update master model 400 according to the experience of the automated agent 402 providing the updated data 406. Consequently, automated agents 402 instantiated thereafter will have benefit of the learnings reflected in updated data 406. System 100' may also sends model changes 408 to the other automated agents 402 so that these pre-existing automated agents 402 will also have benefit of the learnings reflected in updated data 406. In some embodiments, system 100' sends model changes 408 to automated agents 402 in quasi-real time, e.g., within a few seconds, or within one second. In one specific embodiment, system 100' sends model changes 408 to automated agents 402 using a stream-processing platform such as Apache Kafka, provided by the Apache Software Foundation. In some embodiments, system 100' processes updated data 406 to optimize expected aggregate reward across based on the experiences of a plurality of automated agents 402.

In some embodiments, system 100' obtains updated data 406 after each time step. In other embodiments, system 100' obtains updated data 406 after a predefined number of time steps, e.g., 2, 5, 10, etc. In some embodiments, system 100' updates master model 400 upon each receipt updated data

406. In other embodiments, system 100' updates master model 400 upon reaching a predefined number of receipts of updated data 406, which may all be from one automated agent 402 or from a plurality of automated agents 402.

In one example, system 100' instantiates a first automated agent 402 and a second automated agent 402, each from master model 400. System 100' obtains updated data 406 from the first automated agents 402. System 100' modifies master model 400 in response to the updated data 406 and then applies a corresponding modification to the second automated agent 402. Of course, the roles of the automated agents 402 could be reversed in another example such that system 100' obtains updated data 406 from the second automated agent 402 and applies a corresponding modification to the first automated agent 402.

In some embodiments of system 100', an automated agent may be assigned all tasks for a parent order. In other embodiments, two or more automated agent 400 may cooperatively perform tasks for a parent order; for example, child slices may be distributed across the two or more automated agents 402.

In the depicted embodiment, system 100' may include a plurality of I/O units 102, processors 104, communication interfaces 106, and memories 108 distributed across a plurality of computing devices. In some embodiments, each automated agent may be instantiated and/or operated using a subset of the computing devices. In some embodiments, each automated agent may be instantiated and/or operated using a subset of available processors or other compute resources. Conveniently, this allows tasks to be distributed across available compute resources for parallel execution. Other technical advantages include sharing of certain resources, e.g., data storage of the master model, and efficiencies achieved through load balancing. In some embodiments, number of automated agents 402 may be adjusted dynamically by system 100'. Such adjustment may depend, for example, on the number of parent orders to be processed. For example, system 100' may instantiate a plurality of automated agents 402 in response to receive a large parent order, or a large number of parent orders. In some embodiments, the plurality of automated agents 402 may be distributed geographically, e.g., with certain of the automated agent 402 placed for geographic proximity to certain trading venues.

In some embodiments, the operation of system 100' adheres to a master-worker pattern for parallel processing. In such embodiments, each automated agent 402 may function as a "worker" while system 100' maintains the "master" by way of master model 400.

System 100' is otherwise substantially similar to system 100 described herein and each automated agent 402 is otherwise substantially similar to automated agent 200 described herein.

Figure 7:
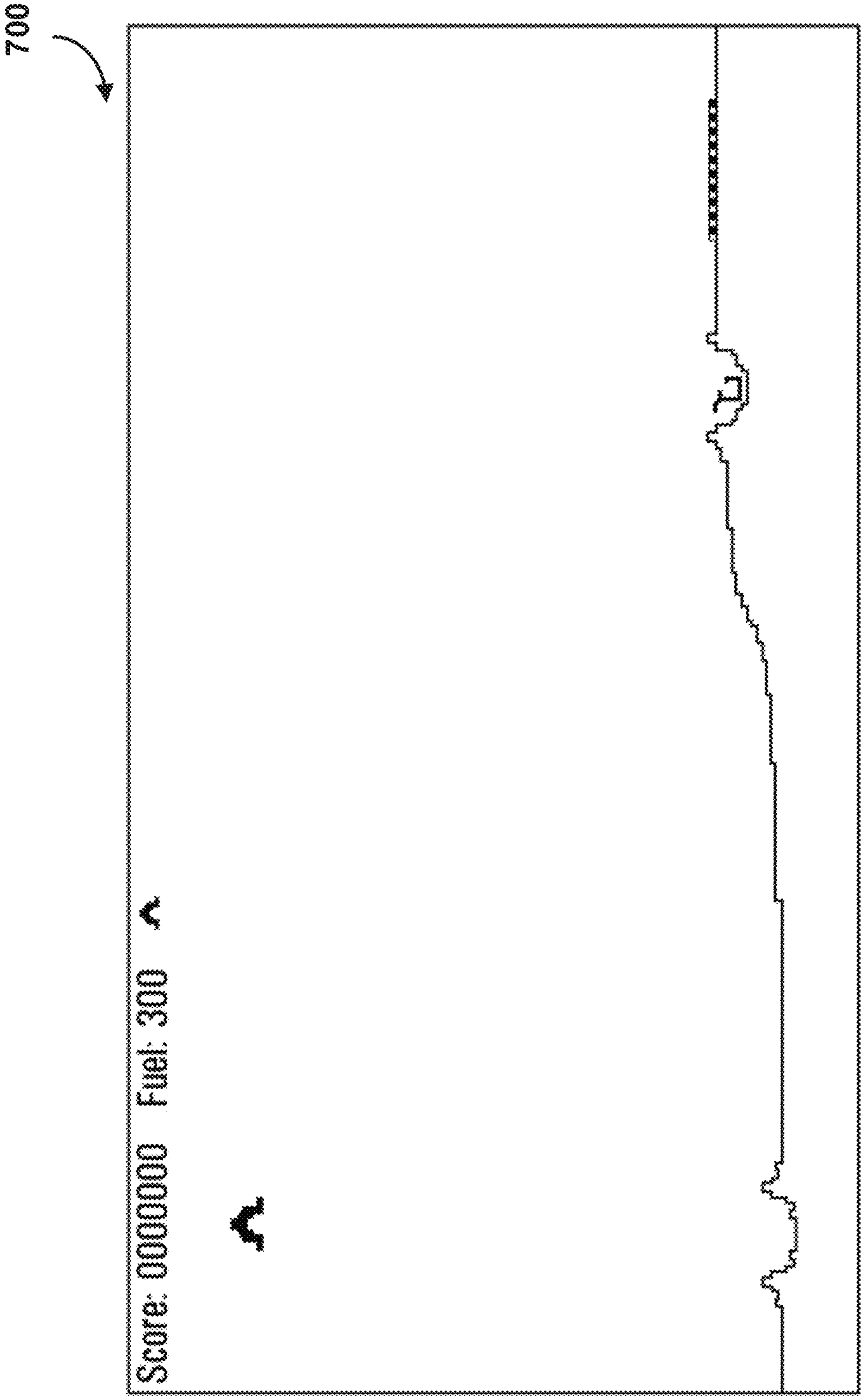
FIG. 7 is an example screen from a lunar lander game, in accordance with an embodiment.

An automated agent 200 in system 100 may be trained to play a video game, and more specifically, a lunar lander game 700, as shown in FIG. 7. In this game, the goal is to control the lander's two thrusters so that it quickly, but gently, settles on a target landing pad. In this example, state data 312 provided as input to an automated agent 200 may include, for example, X-position on the screen, Y-position on the screen, altitude (distance between the lander and the ground below it), vertical velocity, horizontal velocity, angle of the lander, whether lander is touching the ground (Boolean variable), etc.

Each such group of related state data 312 may be referred to herein as a "factor". A group of related state data 312 may also be referred to herein as a cluster of state variables. In the Lunar Lander example, the agent 200 may receive a group definition data structure defining the following plurality of groups of state variables:

Group 1: X-position, horizontal velocity;

Group 2: Y-position, altitude, vertical velocity; and

Group 3: Angle of the lander, angular velocity.

The weighted vector w 305, which is input data to agent 200, may indicate that the factor corresponding to the Group 2 state data 312 (i.e., Y-position, altitude, and vertical velocity) is the most important factor (e.g., has the highest weight assigned) for decision-making by an automated agent 200. This may be reported to a human operator of system 100, e.g., by way of a graphical representation sent to interface application 130, to help that operator understand how automated agent 200 made certain decisions. In some embodiments, this may increase transparency and trust in automated agent 200.

In some embodiments, the weighted vector w 305 may indicate a plurality of objectives including: smoothness of landing, conservation of fuel, time used to land, and distance to a target area on the landing pad. Each of these objectives may be assigned a respective weight, and the weighted vector w 305 may be determined based on each of the objectives and their respective weight. In turn, a preference-weighted reward vector r 315 may be determined based on the weighted vector w 305, which is then used to train the neural network 307, 308 for landing the lunar lander.

Figure 10:
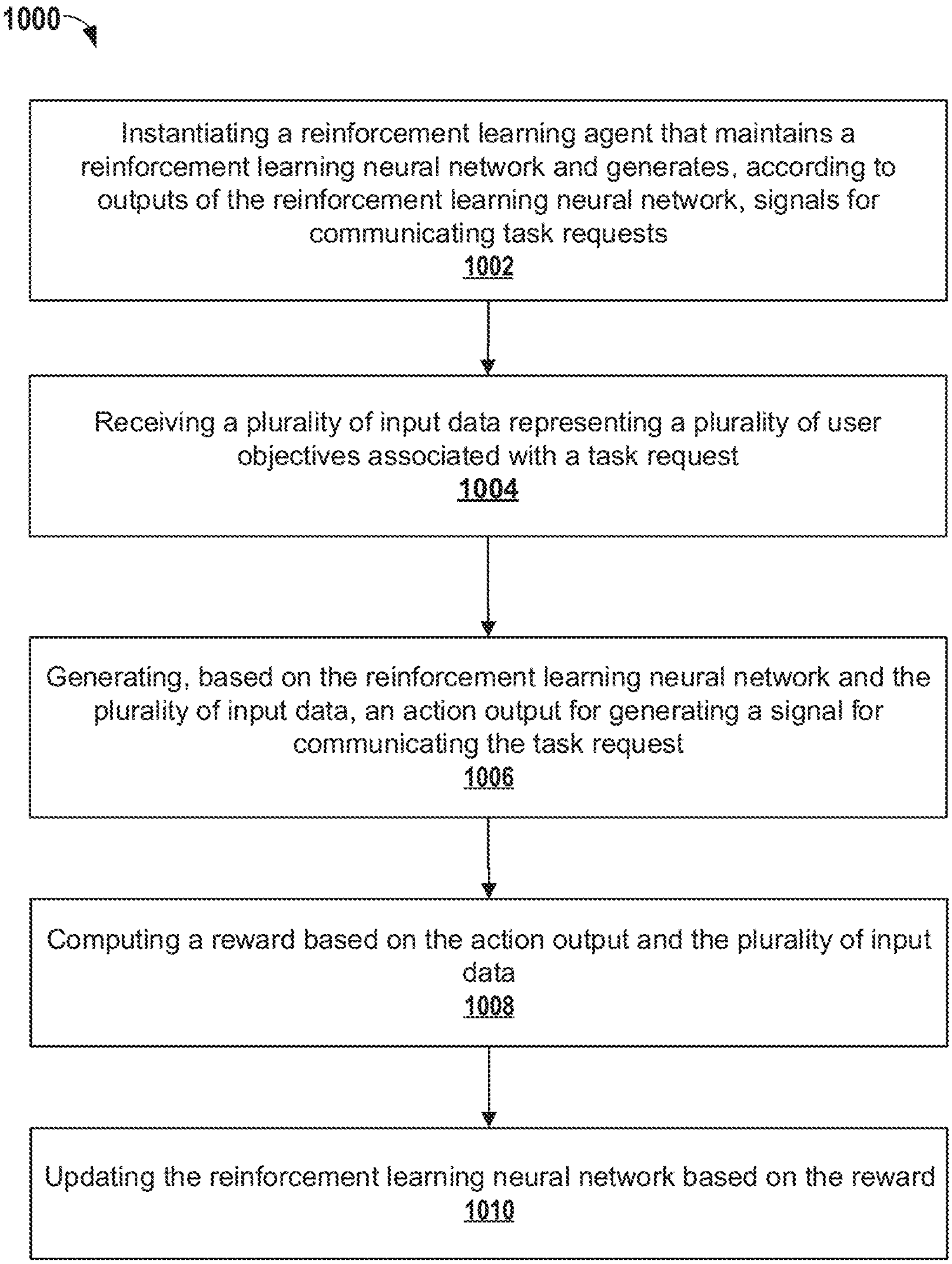
FIG. 10 is a flowchart showing example operation of the system 100 of FIG. 1, in accordance with an embodiment.

The operation of learning system 100 is further described with reference to the flowchart depicted in FIG. 10. System 100 performs the example operations 1000 depicted at blocks 1002 and onward, in accordance with an embodiment.

At block 1002, system 100 instantiates a reinforcement learning agent 200 that maintains a reinforcement learning neural network 307, 308 and generates, according to outputs of the reinforcement learning neural network 307, 308, output signals for communicating task requests. The output signals for communication task request may be represented as an action output or simply action 310.

At block 1004, system 100 receives a plurality of input data representing a plurality of user objectives associated with a task request. The plurality of input data may be received from interface application 130 and processed to generate a preference-weighted vector w 305. In some embodiments, the plurality of input data may be already in the form of a preference-weighted vector w 305 upon receipt by the agent 200.

In some embodiments, the plurality of user objectives comprises two or more of: an asset, an amount for execution, a priority for execution, and a time limit for execution.

In some embodiments, the plurality of input data comprises a weighted vector w 305 determined based on a relative importance of each of the plurality of user objectives. The relative importance may be referred to as a weight. The respective weights of the plurality of user objectives may add up to 1.

In some embodiments, system 100 also receives external data 303, which may be, for example, order and market data 303, which may include a set of historical task data including a historical task request. For example, a historical task request in order and market data 303 may include:

$A_h$: a historical asset or resource to execute;

$V_h$: the amount of the historical asset or resource (e.g., number of shares) the user specified to buy or sell; and $T_h$: the historical time limit to execute the specified quantity.

While (A, T, V) is the general task request given to agent 200, and describes the parameters that agent 200 needs to process to execute the task request. ($A_h$, $T_h$, $V_h$) represents a similar historical task request for the same resource. Agent 200 is configured to process weighted vector w 305, a current state data 312, and one or more sets of historical task data from the order and market data 303 to generate output signal (action output 310) as in block 1006 below.

At block 1006, system 100 generates, based on the reinforcement learning neural network 307, 308 and the plurality of input data 305, an action output 310 for generating a signal for communicating or executing the task request.

In some embodiments, based on the action output 310, system 100 may generate at least one command signal for operating a physical system, such as a command to a vehicle system of a vehicle for driving or parking the vehicle.

For instance, the action output 310 may include data representing a target velocity and a target traveling direction for the vehicle, and system 100 may in turn generate a command signal for the vehicle system to meet the target velocity and the target traveling direction specified in the action output 310. The vehicle system, through a controller unit, can process the received command signal to cause a change in various mechanical parts of the vehicle in order to achieve the target velocity and the target traveling direction when the vehicle is in motion. For instance, the controller unit of the vehicle system may generate an angle for a steering wheel of the vehicle and a corresponding acceleration or deceleration. The controller unit of the vehicle system may also determine an updated traveling trajectory based on the target velocity and the target traveling direction, and transmit the updated traveling trajectory back to system 100, which may use the feedback of updated traveling trajectory to compute a reward 315.

At block 1008, system 100 computes a reward based on the action output 310 and the plurality of input data, which may be weighted vector w 305.

In some embodiments, the reward is weighted based on the weighted vector w 305.

In some embodiments, the reward comprises a vector r 315 having a plurality of individual reward values, each of the plurality of individual reward values being a weighted value computed based on the relative importance of each respective objective from the plurality of user objectives. For example, the weighted reward vector r 315 is computed based on the weighted vector w 305.

In some embodiments, the preference-weighted reward vector r 315 can be calculated as $w^T$ r. The preference-weighted reward vector r 315 (which can also be written as $\vec{r}$) can include a plurality of weighted rewards, each respective weighted reward being related to a respective objective (e.g., a respective user objective) having a respective weight or preference from the preference-weighted vector, w 305. For example, consider three distinct user objectives A, B, C with respective preference weights of 0.2, 0.5, 0.3 and respective scalar rewards $R_A$, $R_B$, $R_C$, then w 305 can be determined as [0.2, 0.5, 0.3], final scalar reward R would be $0.2R_A+0.5R_B+0.3R_C$, and the reward vector r 315 is $r=[0.2R_A, 0.5R_B, 0.3R_C]$.

At block 1010, system 100 updates the reinforcement learning neural network 307, 308 based on the reward 315, which may be the reward vector r 315.

In some embodiments, the reinforcement learning neural network 307, 308 comprises one of: a Feed Forward Neural Networks (FFNN), a deep network such as multi-layer perceptron (MPL), a recurrent neural network (RNN), and an asynchronous actor critic (A3C) neural network.

In some embodiments, system 100 is further configured to compute a loss based on the weighted reward vector r 315 and a loss function; and updating the reinforcement learning neural network 307, 308 based on the loss.

In some embodiments, system 100 is further configured to: receive a set of historical task data including one or more of: at least one historical state data for a historical task associated with the task request, a plurality of historical user objectives, and at least one historical action output for the at least one historical state data; generate an augmented data based on the set of historical task data and the plurality of user objectives associated with the task request; and compute an updated reward based on the augmented data.

The set of historical task data may be concatenated with preference-weighted vector w 305 to form augmented data 320, which is then used to compute an updated reward 316 based on the augmented data 320.

In some embodiments, system 100 is further configured to: compute an updated loss 325 based on the updated reward 316 using a loss function; and update the reinforcement learning neural network 308 based on the updated loss 325.

In some embodiments, system 100 is further configured to generate a historical weighted vector based on the plurality of historical user objectives, the historical weighted vector with weights defining a relative importance of each of the plurality of historical user objectives.

In some embodiments, the updated reward 316 is computed based on the historical weighted vector.

It should be understood that steps of one or more of the blocks depicted in FIG. 8 may be performed in a different sequence or in an interleaved or iterative manner. Further, variations of the steps, omission or substitution of various steps, or additional steps may be considered.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

The embodiments and examples described herein are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

The invention claimed is:

1. A computer-implemented system for processing multiple input objectives by a reinforcement learning agent, the system comprising:

at least one processor;

memory in communication with the at least one processor;

software code stored in the memory, which when executed at the at least one processor causes the system to:

instantiate a reinforcement learning agent that maintains a reinforcement learning neural network interacting with an environment and generates, according to outputs of the reinforcement learning neural network, signals for communicating task requests;

receive current state data characterizing a state of the environment;

receive a plurality of input data representing a plurality of current user objectives associated with a task request for a resource, the plurality of current user objectives associated with a current importance defining a relative importance of each of the plurality of current user objectives;

receive a set of historical task data associated with historical task requests for the resource, the set of historical task data including historical state data characterizing at least one historical state of the environment, and at least one corresponding historical action of the reinforcement learning agent;

sample, from the set of historical task data, a subset of the set of historical task data associated with a plurality of historical user objectives having a historical importance defining a relative importance of each of the plurality of historical user objectives, the historical importance being different from the current importance;

generate augmented data including the subset of the set of historical task data and the plurality of current user objectives;

compute a reward based on the augmented data, the historical importance and the current state data;

update network parameters of the reinforcement learning neural network based on the reward to train the reinforcement learning agent; and generate, based on the trained reinforcement learning neural network, the current state data, and the plurality of input data, a signal for communicating the task request.

2. The system of claim 1, wherein the plurality of input data comprises a weighted vector with weights defining a relative importance of each of the plurality of current user objectives.

3. The system of claim 2, wherein the reward is weighted based in part on the weighted vector.

4. The system of claim 1, wherein the reward comprises a vector having a plurality of individual reward values, each of the plurality of individual reward values being a weighted value computed based on the relative importance of each respective objective from the plurality of historical user objectives.

5. The system of claim 1, wherein the plurality of current user objectives comprises at least two of: an asset, an amount for execution, a priority for execution, or a time limit for execution.

6. The system of claim 1, wherein the reinforcement learning neural network comprises at least one of: a Feed Forward Neural Networks (FFNN), a multi-layer perceptron (MLP), a recurrent neural network (RNN), or an asynchronous actor critic (A3C) neural network.

7. The system of claim 1, wherein the software code, when executed at the at least one processor, further causes the system to:

compute a loss based on the reward using a loss function; and update the parameters of the reinforcement learning neural network based on the loss.

8. The system of claim 1, wherein the set of historical task data includes the plurality of historical user objectives.

9. The system of claim 1, wherein the software code, when executed at the at least one processor, further causes the system to:

generate a historical weighted vector based on the plurality of historical user objectives, the historical weighted vector with weights defining the relative importance of each of the plurality of historical user objectives.

10. The system of claim 9, wherein the reward is computed based on the historical weighted vector.

11. A computer-implemented method for processing multiple input objectives by a reinforcement learning agent, the method comprising:

instantiating a reinforcement learning agent that maintains a reinforcement learning neural network interacting with an environment and generates, according to outputs of the reinforcement learning neural network, signals for communicating task requests;

receiving current state data characterizing a state of the environment;

receiving a plurality of input data representing a plurality of current user objectives associated with a task request, the plurality of current user objectives associated with a current importance defining a relative importance of each of the plurality of current user objectives;

receiving a set of historical task data associated with historical task requests for the resource, the set of historical task data including historical state data characterizing at least one historical state of the environment, and at least one corresponding historical action of the reinforcement learning agent;

sampling, from the set of historical task data, a subset of the set of historical task data associated with a plurality of historical user objectives having a historical importance defining a relative importance of each of the plurality of historical user objectives, the historical importance being different from the current importance;

generating augmented data including the subset of the set of historical task data and the plurality of current user objectives;

computing a reward based on the augmented data, the historical importance and the current state data;

updating network parameters of the reinforcement learning neural network based on the reward to train the reinforcement learning agent; and generating, based on the trained reinforcement learning neural network, the current state data, and the plurality of input data, a signal for communicating the task request.

12. The method of claim 11, wherein the plurality of input data comprises a weighted vector with weights defining a relative importance of each of the plurality of current user objectives.

13. The method of claim 12, wherein the reward is weighted based in part on the weighted vector.

14. The method of claim 11, wherein the reward comprises a vector having a plurality of individual reward values, each of the plurality of individual reward values being a weighted value computed based on the relative importance of each respective objective from the plurality of historical user objectives.

15. The method of claim 11, wherein the plurality of current user objectives comprises at least two of: an asset, an amount for execution, a priority for execution, or a time limit for execution.

16. The method of claim 11, wherein the reinforcement learning neural network comprises at least one of: a Feed Forward Neural Networks (FFNN), a multi-layer perceptron (MLP), a recurrent neural network (RNN), or an asynchronous actor critic (A3C) neural network.

17. The method of claim 11, further comprising:

computing a loss based on the reward using a loss function; and updating the parameters of the reinforcement learning neural network based on the loss.

18. The method of claim 11, wherein the set of historical task data includes the plurality of historical user objectives.

19. The method of claim 11, further comprising generating a historical weighted vector based on the plurality of historical user objectives, the historical weighted vector with weights defining a relative importance of each of the plurality of historical user objectives.

20. The method of claim 19, wherein the reward is computed based on the historical weighted vector.

21. A non-transitory computer-readable storage medium storing instructions which when executed cause at least one computing device to:

instantiate a reinforcement learning agent that maintains a reinforcement learning neural network interacting with an environment and generates, according to outputs of the reinforcement learning neural network, signals for communicating task requests;

receive current state data characterizing a state of the environment;

receive a plurality of input data representing a plurality of user objectives associated with a task request for a resource, the plurality of current user objectives associated with a current importance defining a relative importance of each of the plurality of current user objectives;

receive a set of historical task data associated with historical task requests for the resource, the set of historical task data including historical state data characterizing at least one historical state of the environment, and at least one corresponding historical action of the reinforcement learning agent;

sample, from the set of historical task data, a subset of the set of historical task data associated with a plurality of historical user objectives having a historical importance defining a relative importance of each of the plurality of historical user objectives, the historical importance being different from the current importance;

generate augmented data including the subset of the set of historical task data and the plurality of current user objectives;

compute a reward based on the augmented data, the historical importance and the current state data;

update network parameters of the reinforcement learning neural network based on the reward to train the reinforcement learning agent; and generate, based on the trained reinforcement learning neural network, the current state data, and the plurality of input data, a signal for communicating the task request.

* * * * *